(12) United States Patent
Hong

(10) Patent No.: US 11,917,706 B2
(45) Date of Patent: Feb. 27, 2024

(54) METHOD AND APPARATUS FOR PERFORMING VEHICLE COMMUNICATION

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 385 days.

(21) Appl. No.: 17/288,899

(22) PCT Filed: Oct. 25, 2019

(86) PCT No.: PCT/KR2019/014110
§ 371 (c)(1),
(2) Date: Apr. 26, 2021

(87) PCT Pub. No.: WO2020/085831
PCT Pub. Date: Apr. 30, 2020

(65) Prior Publication Data
US 2022/0007447 A1    Jan. 6, 2022

(30) Foreign Application Priority Data

Oct. 26, 2018  (KR) .................. 10-2018-0129296
Jul. 30, 2019  (KR) .................. 10-2019-0092446
Oct. 24, 2019  (KR) .................. 10-2019-0133057

(51) Int. Cl.
*H04W 76/18*    (2018.01)
*H04W 76/30*    (2018.01)
(Continued)

(52) U.S. Cl.
CPC ............. *H04W 76/18* (2018.02); *H04W 4/40* (2018.02); *H04W 76/14* (2018.02); *H04W 76/30* (2018.02); *H04W 92/18* (2013.01)

(58) Field of Classification Search
None
See application file for complete search history.

(56) References Cited

U.S. PATENT DOCUMENTS

2006/0187844 A1    8/2006  Chun et al.
2015/0296558 A1    10/2015 Seo et al.
(Continued)

FOREIGN PATENT DOCUMENTS

CN    101651608 A    2/2010
CN    102340886 A    2/2012
(Continued)

OTHER PUBLICATIONS

3GPP, "3rd Generation Partnership Project; Technical Specification Group Radio Access Network; Evolved Universal Terrestrial Radio Access (E-UTRA); Radio Link Control (RLC) protocol specification (Release 15)", 3GPP TS 36.322 V15.1.0 (Jul. 2018), pp. 1-45.
(Continued)

*Primary Examiner* — Minh Trang T Nguyen
(74) *Attorney, Agent, or Firm* — IP Legal Services, LLC

(57) ABSTRACT

Provided are a method and an apparatus for configuring a sidelink radio bearer on a sidelink interface used for vehicle communication and processing radio link failure. The method may include receiving sidelink radio bearer configuration information for configuring a sidelink radio bearer on a sidelink interface used for the vehicle communication from a base station; configuring the sidelink radio bearer based on the sidelink radio bearer configuration information, and transmitting the sidelink radio bearer configuration information to another UE subject to the vehicle communication; detecting a sidelink radio link failure when an acknowledged mode (AM) radio link control (RLC) entity linked to the sidelink radio bearer reaches a maximum number of retransmissions; and indicating the detection of the sidelink radio link failure to a higher layer regardless of
(Continued)

a radio resource control (RRC) state of the UE when the sidelink radio link failure is detected.

20 Claims, 14 Drawing Sheets

(51) Int. Cl.
*H04W 76/14* (2018.01)
*H04W 4/40* (2018.01)
*H04W 92/18* (2009.01)

(56) References Cited

U.S. PATENT DOCUMENTS

| | | |
|---|---|---|
| 2017/0041818 A1 | 2/2017 | Lee et al. |
| 2017/0048011 A1 | 2/2017 | Lee et al. |
| 2017/0048643 A1 | 2/2017 | Lee et al. |
| 2017/0181206 A1 | 6/2017 | Lee et al. |
| 2017/0272384 A1 | 9/2017 | Lee et al. |
| 2017/0273057 A1 | 9/2017 | Lee et al. |
| 2018/0191551 A1 | 7/2018 | Chun |
| 2018/0279401 A1 | 9/2018 | Hong et al. |
| 2018/0302813 A1 | 10/2018 | Hahn et al. |
| 2018/0343692 A1 | 11/2018 | Lee et al. |
| 2019/0037430 A1 | 1/2019 | Lee et al. |
| 2019/0327607 A1 | 10/2019 | Xiao et al. |
| 2020/0053525 A1* | 2/2020 | Byun .............. H04W 28/0268 |

FOREIGN PATENT DOCUMENTS

| | | |
|---|---|---|
| CN | 103179687 A | 6/2013 |
| CN | 107171840 A | 9/2017 |
| CN | 108370593 A | 8/2018 |
| CN | 108617029 A | 10/2018 |
| CN | 108632902 A | 10/2018 |
| JP | 2008-527786 A | 7/2008 |
| KR | 10-1199044 B1 | 11/2012 |
| KR | 10-2015-0044894 A | 4/2015 |
| WO | 2015/163625 A1 | 10/2015 |
| WO | 2017/003230 A1 | 1/2017 |
| WO | 2017/160070 A1 | 9/2017 |
| WO | 2018/066905 A1 | 4/2018 |

OTHER PUBLICATIONS

European Patent Office, European Search Report of corresponding EP Patent Application No. 19876374.0, dated Jun. 14, 2022.
Samsung, "RLC Functions for NR Sidelink", R2-1815525, 3GPP TSG-RAN WG2 Meeting #103bis, Chengdu, China Oct. 8-12, 2018, pp. 1-2.
Huawei et al., "QoS support for NR V2X", R2-1813935, 3GPP TSG-RAN WG2 Meeting #103-Bis, CChengdu, China, Oct. 8-12, 2018, pp. 1-5.
Vivo, "Sidelink unicast in NR", R2-1813921, 3GPP TSG-RAN WG2 Meeting #103 bis, Chengdu, China, Oct. 8-12, 2018.

* cited by examiner

METHOD AND APPARATUS FOR PERFORMING VEHICLE COMMUNICATION

CROSS REFERENCE TO RELATED APPLICATIONS

This application is a National Stage Patent Application of PCT International Patent Application No. PCT/KR2019/014110 (filed on Oct. 25, 2019) under 35 U.S.C. § 371, which claims priority to Korean Patent Application Nos. 10-2018-0129296 (filed on Oct. 26, 2018), 10-2019-0092446 (filed on Jul. 30, 2019), and 10-2019-0133057 (filed on Oct. 24, 2019), the teachings of which are incorporated herein in their entireties by reference.

TECHNICAL FIELD

The present disclosure relates to a method and a device for providing a vehicle-to-everything (V2X) service in next generation wireless access technology (New RAT).

BACKGROUND ART

There is demand for high-capacity data processing, high-speed data processing, and a variety of services using a wireless terminal in vehicles, industrial sites, and the like. Accordingly, there is demand for technology for high-speed and high-capacity telecommunications systems grown out of simple voice-centric services and able to process a variety of scenarios and high-capacity data, such as images, wireless data, machine-type communication data, and the like.

In this regard, the ITU radio communication sector (ITU-R) discloses requirements for the adaptation of international mobile telecommunications-2020 (IMT-2020) international standards. There are many researches for developing next-generation wireless communication technology for satisfying IMT-2020 requirements.

In particular, the $3^{rd}$ generation partnership project (3GPP) conducts research into LTE-Advanced Pro Rel-15/16 standards and new radio access technology (NR) standards in order to meet IMT-2020 requirements referred to as 5G technology requirements. The two standard technologies are planned to be approved as next-generation wireless communication technologies.

5G technology may be applied to and used in autonomous vehicles. In this regard, 5G technology needs to be applied to vehicle-to-everything (V2X) communications. For autonomous driving, it is necessary to transmit and receive increasing amounts of data at high speeds with high reliability.

In addition, both unicast data transmission and reception and multicast data transmission and reception using vehicle communications must be provided in order to meet driving scenarios, such as platooning, of a variety of autonomous vehicles.

In this situation, it is necessary to develop a technology for ensuring high reliability data transmission and reception in the vehicle communication.

DETAILED DESCRIPTION OF THE INVENTION

Technical Problem

The embodiments may provide a method and apparatus for performing vehicle communication using a next-generation wireless access technology.

In addition, the present embodiments may provide a technology for transmitting high reliability data through vehicle communication.

Technical Solution

According to an embodiment of the disclosure, a method may be provided for performing a vehicle communication by a user equipment (UE). The method may include receiving sidelink radio bearer configuration information for configuring a sidelink radio bearer on a sidelink interface used for the vehicle communication from a base station, configuring the sidelink radio bearer based on the sidelink radio bearer configuration information, and transmitting the sidelink radio bearer configuration information to another UE subject to the vehicle communication, detecting a sidelink radio link failure when an AM RLC entity linked to the sidelink radio bearer reaches a maximum number of retransmissions, and indicating the detection of the sidelink radio link failure to a higher layer regardless of the RRC state of the UE when the sidelink radio link failure is detected.

According to an embodiment of the disclosure, a method may be provided for controlling a vehicle communication by a base station. The method may include transmitting sidelink radio bearer configuration information for configuring a sidelink radio bearer on a sidelink interface used for the vehicle communication to the UE, and receiving sidelink failure information from the UE, which is generated when the number of transmission data retransmissions in the AM RLC entity configured in the UE reaches a maximum number of retransmissions based on the sidelink radio bearer configuration information.

According to an embodiment of the disclosure, a UE may be provided for performing a vehicle communication. The UE may include a controller configuring the sidelink radio bearer based on the sidelink radio bearer configuration information, and transmitting the sidelink radio bearer configuration information to another UE subject to the vehicle communication, and detecting a sidelink radio link failure when an AM RLC entity linked to the sidelink radio bearer reaches a maximum number of retransmissions; and a transmitter transmitting the sidelink radio bearer configuration information to another UE subject to the vehicle communication. The controller may instruct the detection of the sidelink radio link failure to a higher layer regardless of the RRC state of the UE when the sidelink radio link failure is detected According to an embodiment of the disclosure, a base station may be provided for controlling a vehicle communication. The base station node may include a transmitter transmitting sidelink radio bearer configuration information for configuring a sidelink radio bearer on a sidelink interface used for the vehicle communication to the UE, and a receiver receiving sidelink failure information from the UE, which is generated when the number of transmission data retransmissions in the AM RLC entity configured in the UE reaches a maximum number of retransmissions based on the sidelink radio bearer configuration information.

Advantageous Effects

According to the present embodiments, it is possible to provide a method and apparatus for performing the vehicle communication using a next-generation wireless access technology.

BRIEF DESCRIPTION OF DRAWINGS

The above and other aspects, features, and advantages of the disclosure will be more apparent from the following detailed description taken in conjunction with the accompanying drawings, in which.

MODE FOR CARRYING OUT THE INVENTION

Figure 1:
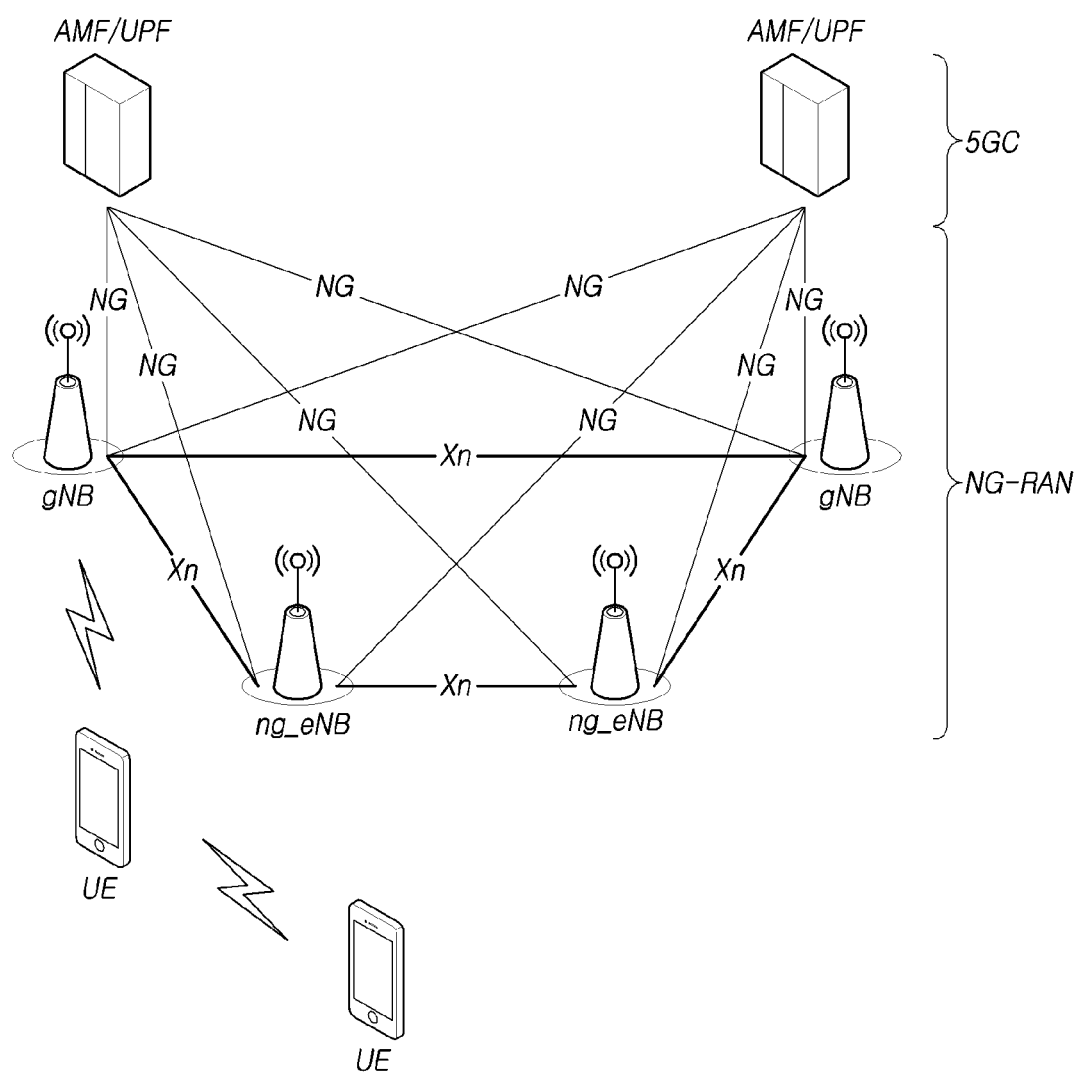
FIG. 1 is a view schematically illustrating an NR wireless communication system in accordance with embodiments of the disclosure.

Hereinafter, some embodiments of the disclosure will be described in detail with reference to the accompanying illustrative drawings. In the drawings, like reference numerals are used to denote like elements throughout the drawings, even if they are shown on different drawings. Further, in the following description of the disclosure, a detailed description of known functions and configurations incorporated herein will be omitted when it may make the subject matter of the disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from another UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-

OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
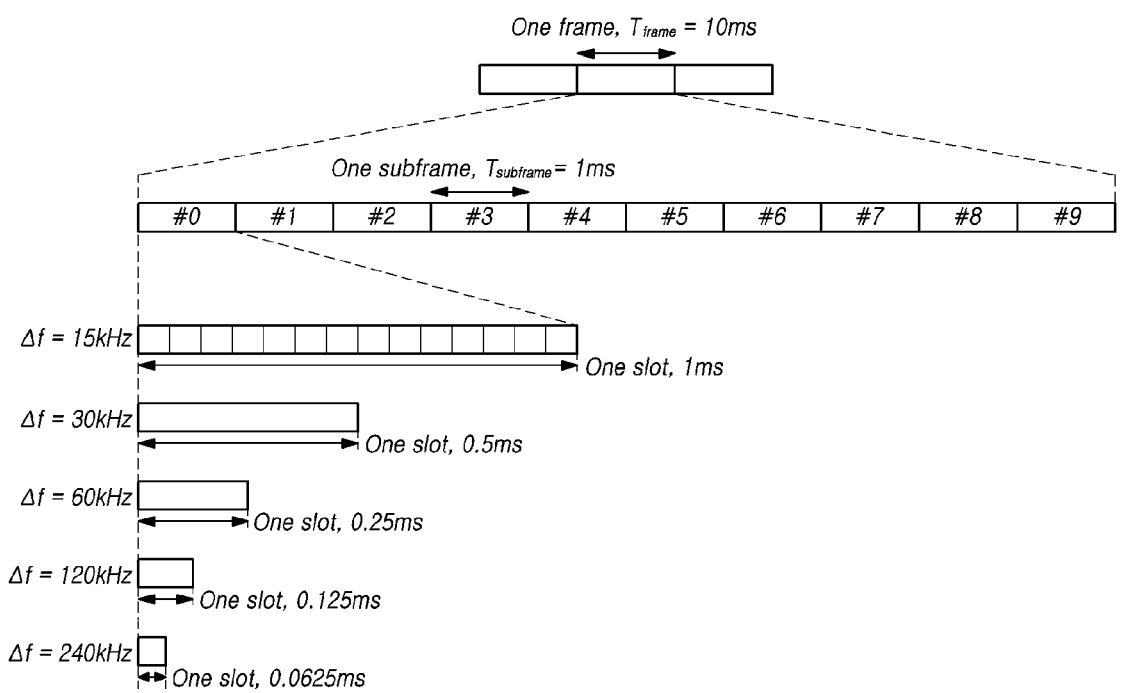
FIG. 2 is a view schematically illustrating a frame structure in an NR system in accordance with embodiments of the disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by indicating, using the SFI, the index of a table configured through UE-specific RRC signaling. Further, the base station may dynamically indicate the slot format through downlink control information (DCI) or may statically or quasi-statically indicate the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
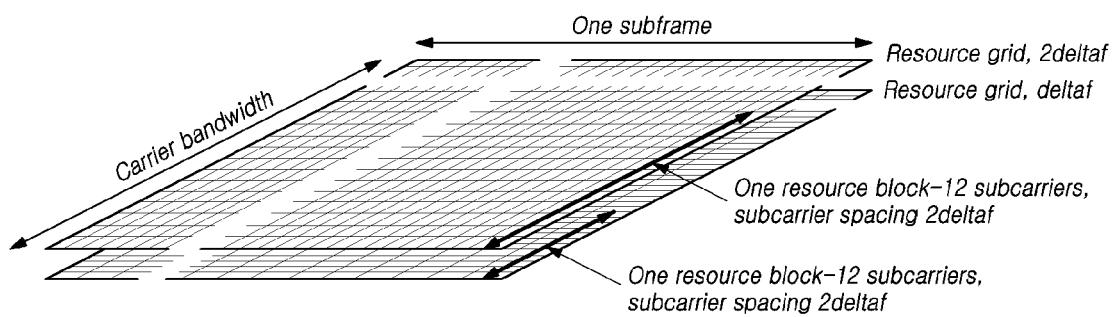
FIG. 3 is a view for explaining resource grids supported by a radio access technology in accordance with embodiments of the disclosure.

FIG. 3 illustrates resource grids supported by a radio access technology in accordance with embodiments of the disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
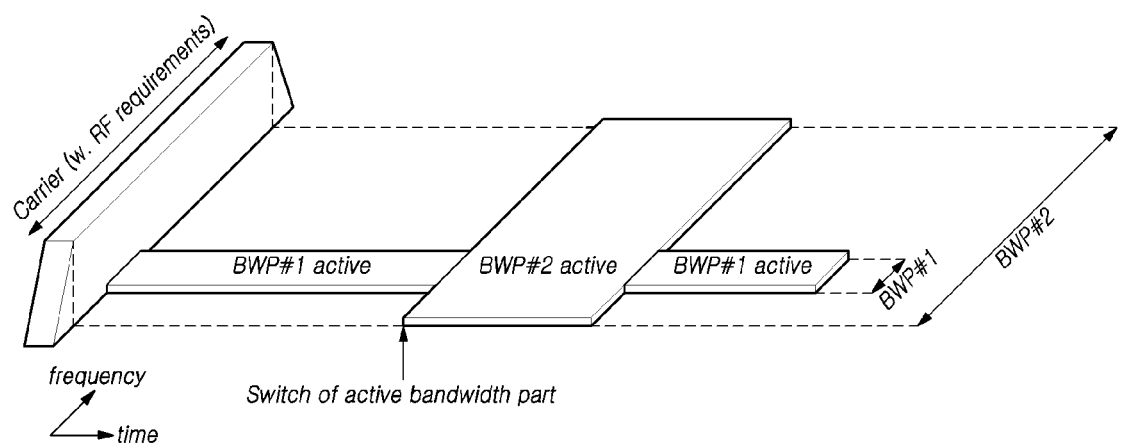
FIG. 4 is a view for explaining bandwidth parts supported by a radio access technology in accordance with embodiments of the disclosure.

FIG. 4 illustrates bandwidth parts supported by a radio access technology in accordance with embodiments of the disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
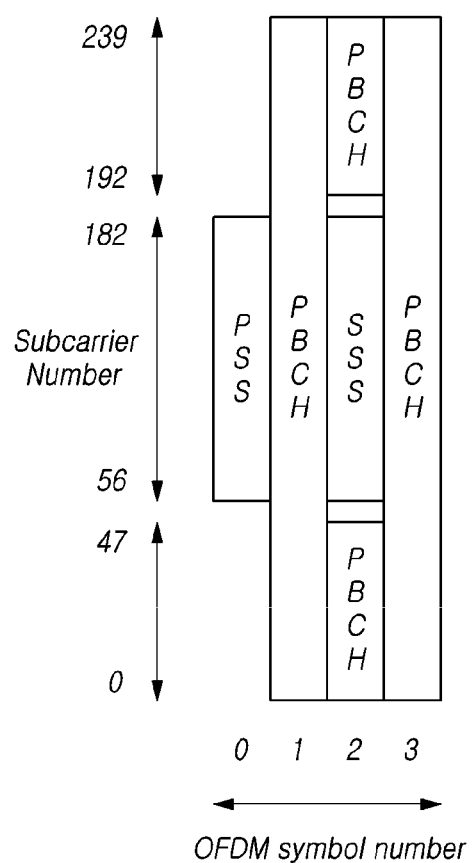
FIG. 5 is a view illustrating an example of a synchronization signal block in a radio access technology in accordance with embodiments of the disclosure.

FIG. 5 illustrates an example of a synchronization signal block in a radio access technology in accordance with embodiments of the disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
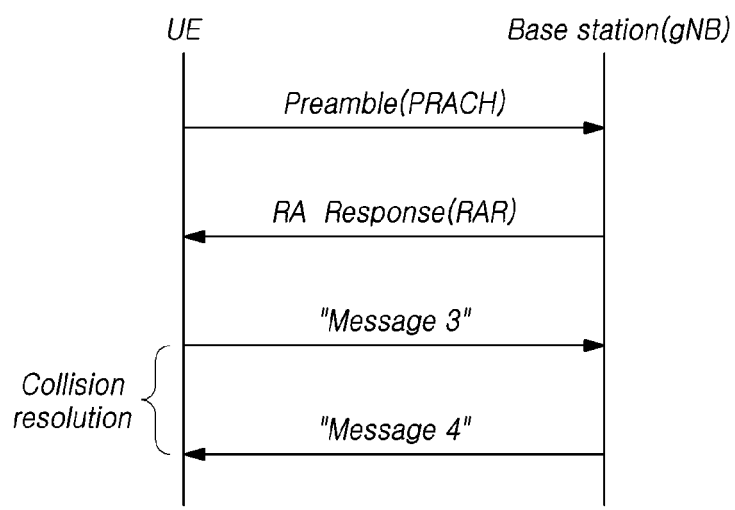
FIG. 6 is a signal diagram for explaining a random access procedure in a radio access technology in accordance with embodiments of the disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
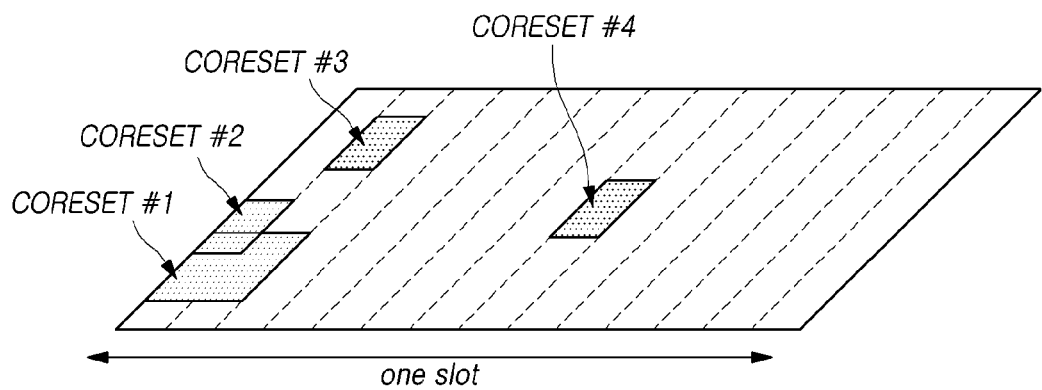
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., indicated, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

As described above, the NR has been recently conducted in 3GPP and has been designed to satisfy not only an improved data rate compared to LTE, but also various QoS requirements required for each specific and detailed usage scenarios. In particular, as a representative NR usage scenario, eMBB (enhancement Mobile Broadband), mMTC (massive MTC) and URLLC (Ultra Reliable and Low Latency Communications) have been defined. In order to meet the requirements for each scenario, it is required to design a frame structure more flexible as compared to that of LTE. Each use scenario has different requirements in light of data rate, latency, reliability, and coverage. Therefore, as a method to efficiently satisfy the requirements for each usage scenario through the frequency band constituting an NR system, it has been designed to efficiently multiplex radio resource units which are based on different numerologies (e.g., subcarrier spacing, subframe, TTI, etc.).

As an example, for the numerology each having different subcarrier spacing values, there are discussions about a method of multiplexing and supporting based on TDM, FDM, or TDM/FDM via one or more NR component carriers and a scheme for supporting one or more time units in configuring a scheduling unit in the time domain. In this regard, in the NR, a subframe is defined as a kind of time domain structure. It was decided to define a single subframe duration consisting of 14 OFDM symbols of normal CP overhead based on 15 kHz Sub-Carrier Spacing (SCS) identical to LTE as a reference numerology for defining the corresponding subframe duration. Accordingly, in the NR, the subframe has a time duration of 1 ms. However, unlike the LTE, the subframe of the NR is an absolute reference time duration, and as a time unit which serves as a basis of actual uplink/downlink data scheduling, a slot and a mini-slot may be defined. In this case, the number (y value) of OFDM symbols constituting a corresponding slot is determined to be y=14 regardless of the SCS value in the case of normal CP.

Therefore, one slot is constituted of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), the mini-slot may be defined to be constituted of a smaller number of symbols than the slot described above. For minislot-based uplink/downlink data transmission/reception, a short-length time-domain scheduling interval may be set, or a long-length time-domain scheduling interval for uplink/downlink data transmission/reception may be configured via slot aggregation. In particular, in the case of transmitting or receiving latency-sensitive data, such as URLLC, if scheduling is performed in slot units which are based on 1 ms (14 symbols) as defined in the numerology-based frame structure which has a small SCS value, e.g., 15 kHz, it is difficult to satisfy the latency requirements. Thus, a mini-slot may be defined to be constituted of a smaller number of OFDM symbols than the slot constituted of 14 symbols. Based thereupon, it is possible to carry out scheduling that satisfies the URLLC requirements.

Figure 8:
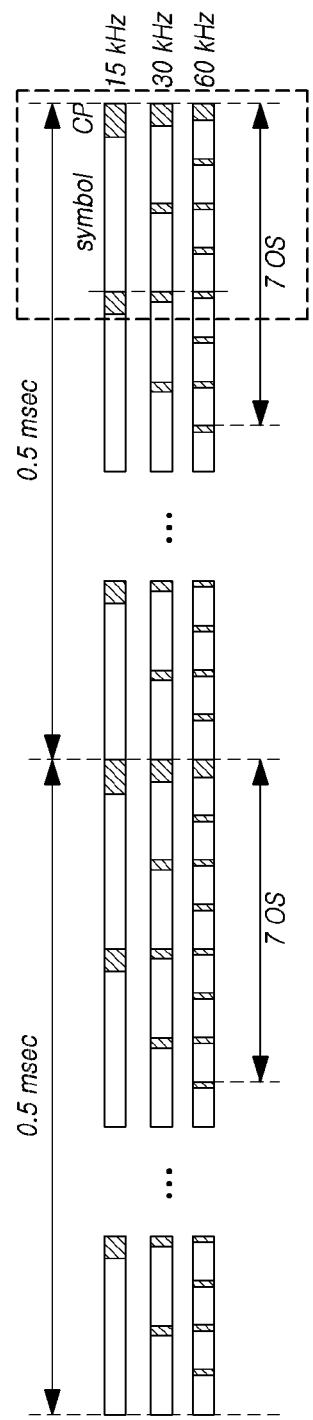
FIG. 8 is a view illustrating an exemplary symbol level alignment between different SCSs in a radio access technology.

FIG. 8 is a view illustrating an exemplary symbol level alignment between different SCSs in a radio access technology.

Referring to FIG. 8, as described above, the numerologies each having different SCS values in one NR carrier may be supported by multiplexing based on a TDM and/or FDM scheme. Therefore, there is consideration on a method of scheduling data according to latency requirements based on the slot (or mini-slot) length defined for each numerology. For example, if the SCS is 60 kHz, the symbol length is reduced by about ¼ compared to the SCS 15 kHz, so if one slot is configured with the same 14 OFDM symbols, the 15 kHz-based slot length becomes 1 ms. On the other hand, the slot length based on 60 kHz is reduced to about 0.25 ms.

LTE V2X Communication

Figure 9:
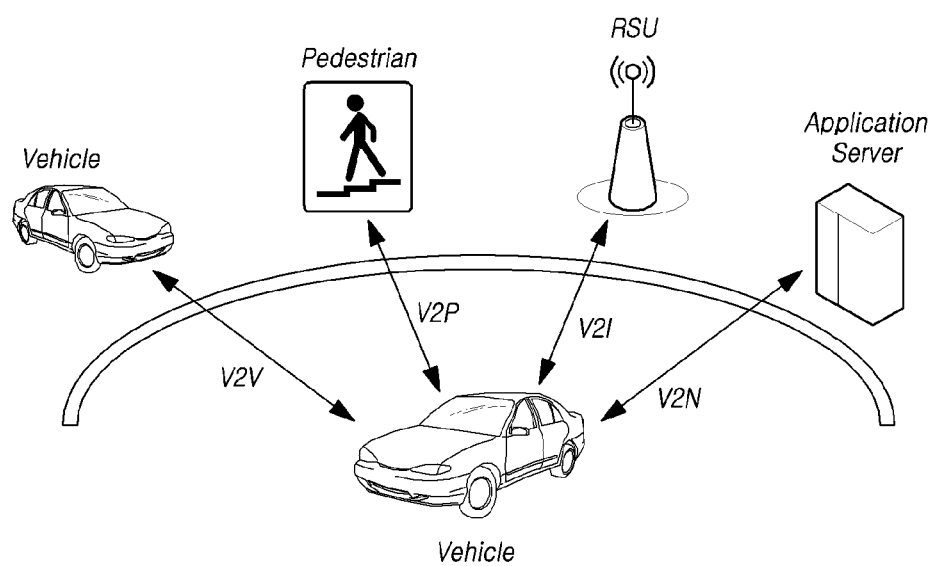
FIG. 9 is a view for explaining a type of vehicle communication.

FIG. 9 is a view for explaining a type of vehicle communication.

Referring to FIG. 9, by enabling the vehicle to access a mobile communication network (e.g., LTE or LTE-Advanced), the vehicle may be connected to the Internet and other vehicles. V2X (Vehicle to Everything) communication includes the following four types.

V2V (Vehicle to Vehicle) Communication: Communication between vehicle and vehicle.

V2I (Vehicle to Infrastructure) Communication: Communication between vehicle and infrastructure.

V2N (Vehicle to Network) Communication: Communication between vehicle and network.

V2P (Vehicle to Pedestrian) Communication: Communication between vehicle and pedestrian.

Figure 10:
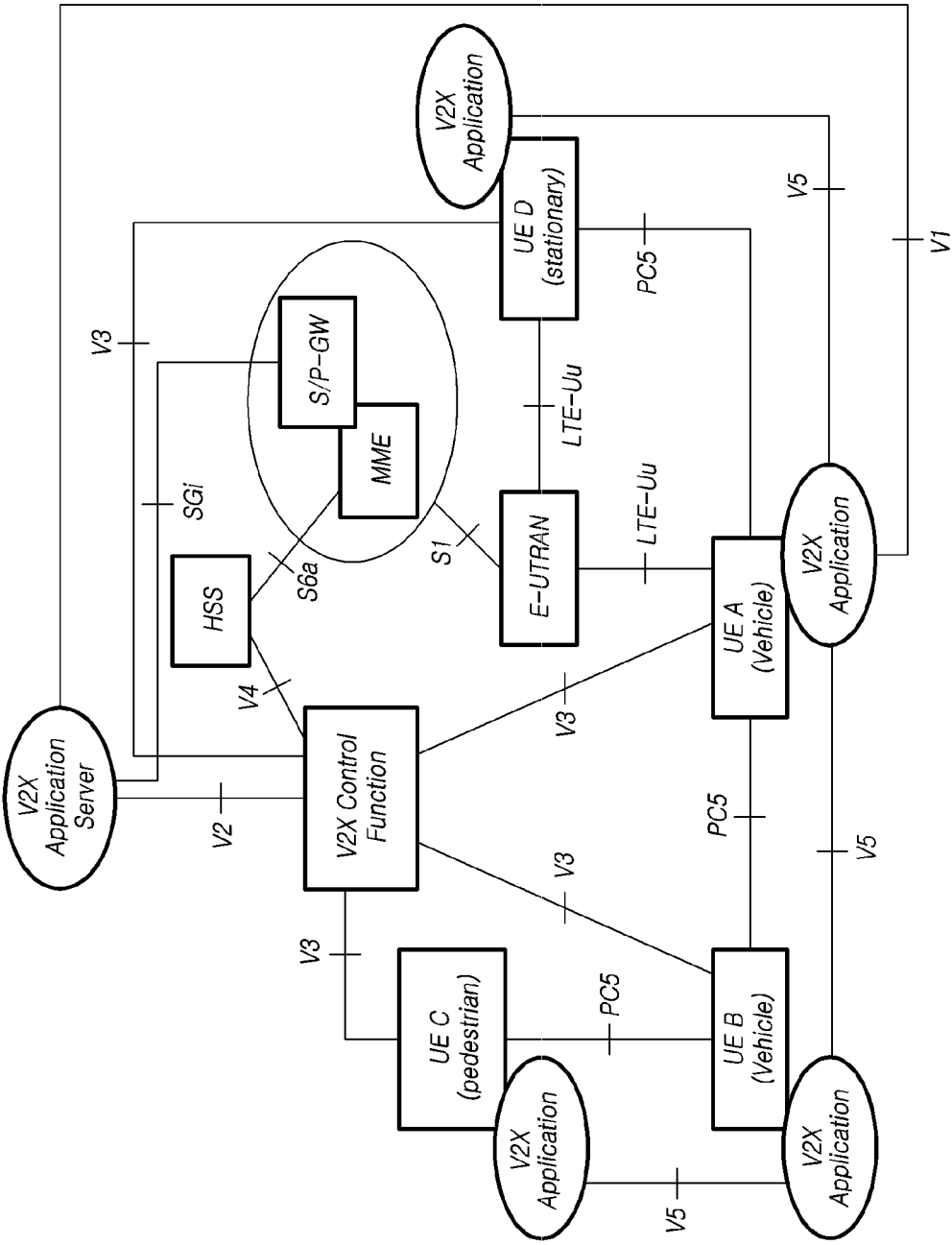
FIG. 10 is a view illustrating an exemplary architecture of a V2X communication system in the LTE system.

FIG. 10 is a view illustrating an exemplary architecture of a V2X communication system in the LTE system.

Referring to FIG. 10, a V2X service may be provided through a PC5 interface and/or a Uu interface. Support through the PC5 interface was provided through V2X sidelink communication.

Specifically, various V2X communication UEs (UE A to D) are linked through the PC5 interface, and a V2X communication UE and a V2X control function are linked through a V3 interface. In addition, the V2X application server and the V2X application of each V2X communication UE are linked through a V1 interface. The V2X communication UE is linked with a base station (E-UTRAN) through a Uu interface, and the base station is linked with a core network (MME and S/P GW) through an S1 interface. MME and S/P GW are linked with HSS through an S6a interface, and HSS is linked with V2X control function through a V4 interface. The core network entity is linked with the V2X application server through the SGi interface. On the other hand, the V2X application of each V2X communication UE is linked to each other through the V5 interface.

In this LTE system, radio channels and radio protocols for direct link (i.e., sidelink) transmission and reception between UEs were designed to provide direct communication between UEs and V2V services.

The user plane details of the typical sidelink communication are as follows.
  There is no HARQ feedback for sidelink communication
  Only RLC UM is used for sidelink communication.
  A receiving UE needs to maintain at least one RLC UM entity per transmitting peer UE.
  A receiving RLC UM entity used for sidelink communication does not need to be configured prior to reception of the first RLC UMD PDU.
  ROHC Unidirectional Mode is used for header compression in PDCP for sidelink communication.

In summary, the sidelink transmission and reception for the V2X service provision in LTE technology was performed based on broadcast. Before the V2X communication, it was not necessary for the transmitting/receiving UE to establish a logical connection, and the sidelink communication only supported the RLC UM mode, which is useful for delay-sensitive services. Before the receiving UE receives the first RLC UM PDU, it was not necessary to configure the receiving RLC UM entity. The receiving UE needed to maintain at least one RLC UM entity for each transmitting UE, and was able to receive the first RLC UM PDU to configure the receiving RLC UM entity and process the received data.

NR V2X Communication

The 3GPP has been conducting research to support advanced V2X services such as vehicles platooning, extended sensors, advanced driving, and remote driving based on the NR. The NR V2X intends to support both sidelink unicast, sidelink groupcast, and sidelink broadcast. In addition, in order to provide the above-described improved V2X service in the NR V2X, it may be necessary to support lossless transmission. For this, it is necessary to support RLC Acknowledged Mode (AM) in the sidelink communication that only supported the RLC UM mode. However, there is no a specific scheme introduced for the sidelink communication supporting the RLC AM.

Therefore, since LTE system-based V2X communication only supported the RLC UM, it was difficult to support improved V2X service through lossless transmission, and it is not suitable for application to data transmission and reception requiring high reliability guarantees such as autonomous driving.

The present disclosure introduces a highly reliable sidelink communication technology based on the RLC AM. Particularly, when an RLC retransmission failure occurs in RLC AM-based sidelink communication, the present disclosure introduces a method for solving a problem causing service interruption.

Each of the embodiments described below may be applied to an NR UE through an NR base station. Alternatively, each embodiment may be applied to an LTE UE through an LTE base station and may be applied to an LTE UE connected to an eLTE base station connected through a 5G system (or 5G Core Network). Alternatively, each embodiment may be applied to an E-UTRAN NR Dual Connectivity (EN-DC) UE or a NE-DC UE that simultaneously provides LTE and NR wireless connectivity.

In this specification, V2X communication may be described as sidelink communication or vehicle communication. In addition, the names of each information in the present specification are exemplary, and the information may be changed into various names according to the definition of the subject of transmission and reception and detailed data included in the information. Meanwhile, the state of the UE may be classified into an RRC connection, an RRC idle state, and an RRC Inactive state. The RRC inactive state may be described as an RRC inactive state, and it is recognized that the corresponding UE is in an RRC connected state between the core network and the base station, and means a state in which the RRC connection between the base station and the UE is released. That is, for the UE in the RRC inactive state, both the related SRB and the DRB are released, and the UE context is stored. In addition, the UE in the RRC inactive state may cause a state transition to the RRC connected state, and to this end, perform an RRC resume procedure.

In the typical LTE system, sidelink transmission and reception for V2X service provision was performed based on broadcast. That is, a transmitting UE broadcasts a sidelink radio channel or radio signal without specifying a receiving UE. The neighboring UEs capable of receiving the broadcasting signal received it and performed sidelink communication.

However, in the case of the NR V2X, it is necessary to support a unicast scheme or a groupcast scheme. In this case, a unicast or groupcast link between one transmitting UE and the corresponding receiving UE(s), or one master UE and the corresponding slave UE(s) is configured. PSSCH transmission resources through the configured link may also be scheduled by the base station or may be selected by the transmitting UE as described above.

Accordingly, in order to provide an improved V2X service, when the unicast method scheme or the groupcast scheme is supported, V2X communication may be performed using the RLC AM that provides lossless transmission.

In the following, for better understanding, it will be described based on the unicast type V2X communication. However, the present disclosure may equally applied to V2X communication of the groupcast/multicast scheme as well as the unicast scheme. In addition, the present disclosure may equally be applied to any D2D communication provided in the unicast manner through the PC5 interface. For example, the present disclosure may be applied to a device supporting PC5 sidelink communication for Proximity-based services (ProSe) disclosed in 3GPP TS23.303 based on the NR.

In addition, in this specification, various terms associated with a sidelink interface are described by adding a sidelink. For example, a radio bearer configured on a sidelink interface is described as a sidelink radio bearer, and RLC configuration information including RLC entity configuration information for the sidelink interface is described as sidelink RLC configuration information. However, this is for only clarification of terms and should be understood as information or constituent objects for sidelinks even when sidelinks are not described. That is, the sidelink radio bearer configuration information and the radio bearer configuration information are used in the same meaning when they are not intended to clearly distinguish them. Likewise, the sidelink RLC configuration information and the RLC configuration information are also used in the same meaning.

Figure 11:
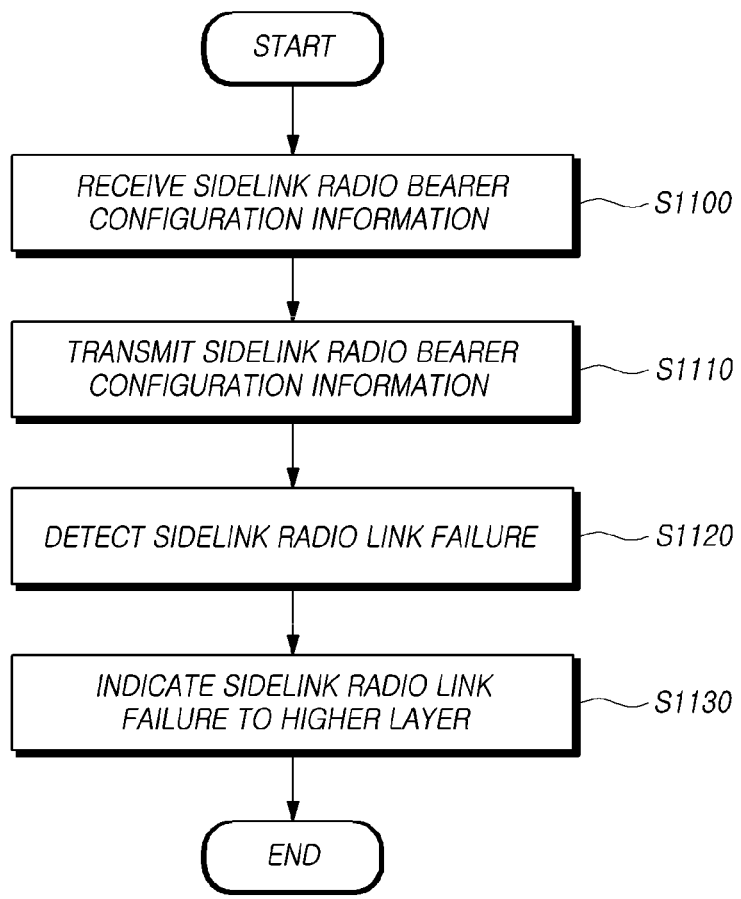
FIG. 11 is a flowchart for describing operations of a UE according to an embodiment.

FIG. 11 is a flowchart for describing operations of a UE according to an embodiment.

Referring to FIG. 11, a user equipment (UE) for performing a vehicle communication (or a Vehicle to everything communication, a V2X communication) may receive sidelink radio bearer configuration information for configuring a sidelink radio bearer on a sidelink interface used for the vehicle communication from a base station at S1100.

For example, the UE performs the vehicle communication through a sidelink interface. Therefore, the UE needs to configure a sidelink radio bearer on the sidelink interface. To this end, the UE receives the sidelink radio bearer configuration information for the sidelink from the base station. The sidelink radio bearer configuration information may include RLC bearer configuration information. The RLC bearer configuration information may include parameters necessary to configure an Acknowledged mode (AM) radio link control (RLC) entity for a sidelink. For example, the RLC bearer configuration information may include uplink AM RLC configuration information and downlink AM RLC configuration information. Here, the uplink refers to a link that transmits data to another UE from the viewpoint of the transmitting UE, and the downlink refers to a link that receives data from another UE from the viewpoint of the transmitting UE. In addition, the sidelink radio bearer configuration information may include information for bidirectional AM RLC configuration. For example, the RLC bearer configuration information may include information for bidirectional AM RLC configuration.

The UE may configure the sidelink radio bearer based on the sidelink radio bearer configuration information and transmit the sidelink radio bearer configuration information to another UE subject to the vehicle communication at S1110.

For example, the UE may inform the sidelink radio bearer parameter related to the sidelink transmission/reception by indicating another UE of the sidelink radio bearer configuration information.

The UE may configure the sidelink radio bearer based on the sidelink radio bearer configuration information before transmitting the sidelink radio bearer configuration information to another UE. Alternatively, the UE may configure the sidelink radio bearer based on the sidelink radio bearer configuration information after transmitting the sidelink radio bearer configuration information to another UE.

For example, the UE configures an AM RLC entity for the sidelink in the UE using the sidelink radio bearer configuration information. In addition, the UE may configure a sidelink radio bearer configured on a sidelink interface for the vehicle communication and link it to the configured AM RLC entity. The sidelink radio bearer may be composed of one or more and may be configured for each V2X service.

The UE may transmit and receive data to and from other vehicle communication UEs on the sidelink interface using the configured sidelink radio bearer. As described above, the data may be transmitted/received by a unicast scheme, but may also be transmitted/received by a groupcast or broadcast scheme.

The UE may monitor the number of retransmissions of transmission data through the sidelink radio bearer by the AM RLC entity linked to the sidelink radio bearer. In addition, the UE may detect a sidelink radio link failure when an AM RLC entity linked to the sidelink radio bearer reaches a maximum number of retransmissions at S1120.

For example, since vehicle communication data is transmitted and received through the AM RLC entity, the UE receives an acknowledgment message for the transmission data from another UE. If the acknowledgment message (e.g., ACK message) for specific transmission data is not received, the AM RLC entity of the UE performs a retransmission operation. Accordingly, in the typical LTE system-based vehicle communication, the ARQ process is not applied, but in the vehicle communication of the present disclosure, the ARQ process operation is applied for securing high reliability.

The AM RLC entity of the UE monitors the number of retransmissions of transmission data transmitted through the sidelink radio bearer. This is because if the transmission data is continuously retransmitted and the number of retransmissions for specific transmission data is indicated by the base station or reaches a pre-configured maximum number of retransmissions, it is necessary to consider a radio link failure.

Accordingly, the AM RLC entity of the UE monitors and determines whether the number of retransmissions of specific transmission data is indicated by the base station or reaches the pre-configured maximum number of retransmission.

The UE may indicate the detection of the sidelink radio link failure to a higher layer regardless of the RRC state of the UE when the sidelink radio link failure is detected at S1130.

The UE recognizes that a problem has occurred in the corresponding sidelink when the number of retransmissions for the specific transmission data in the AM RLC entity is indicated by the base station or reaches a pre-configured maximum number of retransmissions. For example, the UE may detect the radio link failure of the sidelink through which the transmission data is transmitted. In this case, when the base station allocates sidelink radio resources, the UE needs to request the base station to schedule a new sidelink radio resource. Alternatively, the base station needs to recognize the radio link failure of the sidelink for any reason.

To this end, when the number of retransmissions for the specific transmission data in the AM RLC entity of the UE is indicated by the base station or reaches a pre-configured maximum number of retransmission, the UE may indicate it to a higher layer regardless of the RRC state of the UE.

Meanwhile, when the RRC state of the UE is an RRC connection state, the UE may transmit information for indicating the sidelink radio link failure to the base station. For convenience of explanation, information for indicating the sidelink radio link failure is described as sidelink failure information. However, the embodiments are not limited thereto.

As an example, the sidelink failure information may include at least one of serving cell identification information, serving cell measurement result information, sidelink carrier identification information, time stamp information, UE location information, V2X session identification information, and destination L2 ID information. Through this, the base station checks information on a specific cell, carrier, time, location, or session related to the radio link failure situation of the sidelink reported by the UE. If necessary, the base station may allocate a new sidelink radio resource to the UE.

As another example, the sidelink failure information may include sidelink RRC failure type information when the UE is in an RRC connection state. The UE in the RRC connected state may also transmit and receive data with the base station. Therefore, when the UE transmits the radio link failure information to the base station, it may be difficult for the base station to distinguish whether the corresponding radio link failure is a radio link failure with the base station or a radio link failure to another carrier in a dual connectivity or CA situation. Therefore, when the UE is in the RRC connected state, the UE uses an RRC message that is distinguished from an RRC failure information message, or the UE includes RRC failure type information that distinguishes the sidelink failure information, in order to distinguish the sidelink failure information, thereby indicating the sidelink radio link fails due to an exceeded number of retransmissions in a specific radio bearer.

Meanwhile, the UE may perform the vehicle communication even in an RRC state other than the RRC connection state. That is, since data is directly transmitted and received between the transmitting UE and the receiving UE regardless of the connection state with the base station, the UE in the RRC IDLE state or the RRC Inactive state may also perform the vehicle communication.

Accordingly, when the number of AM RLC retransmissions described above reaches the maximum number of retransmissions, the UE in the RRC IDLE state or the RRC Inactive state needs to report the sidelink failure information to the base station.

For example, when the UE is in the RRC idle state or the RRC Inactive state, the sidelink failure information may be transmitted to the base station through the RRC connection establishment procedure of the UE.

As an example, when the UE is in the RRC idle state, the sidelink failure information may be transmitted to the base station while the UE establishes an RRC connection with the base station or after the RRC connection is established. If the sidelink failure information is transmitted during the RRC connection establishment process, it may be included in an RRC setup request message and an RRC setup completion message and the like transmitted from the UE to the base station.

As another example, when the UE is in the RRC Inactive state, the sidelink failure information may be transmitted to the base station during the RRC connection resume process for the UE to transition to the RRC connection state or after RRC connection is established. If the sidelink failure information is transmitted during the RRC connection establishment process, it may be included in an RRC resume request message and an RRC resume completion message transmitted from the UE to the base station.

The sidelink identifier selected according to the sidelink radio bearer configuration may comprise at least one of sidelink radio bearer identification information, sidelink RLC bearer identification information, and sidelink logical channel identifier. In addition, the sidelink identifier is selected by the UE or another UE.

As an example, in configuring the sidelink radio bearer, the UE may select and allocate the sidelink radio bearer identification information, the sidelink RLC bearer identification information, and the sidelink logical channel identifier.

As another example, in configuring the sidelink radio bearer, another UE may select and allocate the sidelink radio bearer identification information, the sidelink RLC bearer identification information, and the sidelink logical channel identifier.

However, the sidelink identifier selected by the UE or another UE must be shared between the UE and other UEs, and the sidelink identifier must be recognized with the same meaning. Accordingly, the UE and another UE may share the sidelink identifier.

Meanwhile, when the UE selects the sidelink identifier, the identifier may have already been allocated by another UE for another purpose or for the sidelink communication with another third UE. Therefore, a processing procedure is required in this case.

As an example, when the selected sidelink identifier is an identifier being used by another UE, another UE may transmit failure information to the base station.

Meanwhile, the sidelink radio bearer configuration information may be received in a different procedure according to the RRC state of the UE.

As an example, the sidelink radio bearer configuration information may be received according to a sidelink radio bearer request signal comprising a QoS parameter of a V2X sidelink session transmitted to the base station when the UE is in an RRC connection state. For example, the UE transmits the sidelink radio bearer request signal to the base station. The sidelink radio bearer request signal includes the QoS parameter of the V2X sidelink session. The base station may transmit sidelink radio bearer configuration information to the UE based on the sidelink radio bearer request signal. If necessary, the sidelink radio bearer configuration information may be generated in association with the QoS parameter of the V2X sidelink session.

As another example, the sidelink radio bearer configuration information may be received through system information when the UE is in a RRC idle state or a RRC Inactive state. That is, the base station may broadcast the system information including sidelink radio bearer configuration information.

Through this operation, the UE may perform the operation of transmitting and receiving sidelink data based on the AM RLC entity without ambiguity, thereby supporting the vehicle communication based on high reliability.

Figure 12:
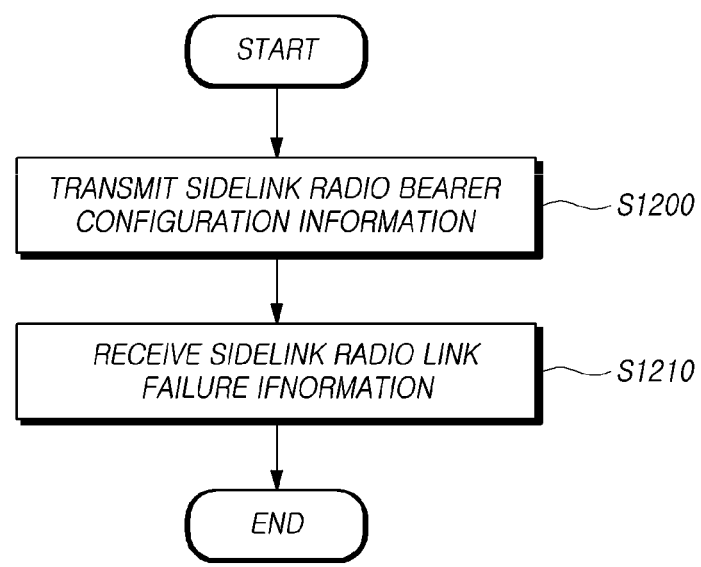
FIG. 12 is a flowchart for describing operations of a base station according to an embodiment.

FIG. 12 is a flowchart for describing operations of a base station according to an embodiment.

Referring to FIG. 12, a base station controlling a vehicle communication may transmit sidelink radio bearer configuration information for configuring a sidelink radio bearer on a sidelink interface used for the vehicle communication to the UE at S1200.

For example, the UE performs the vehicle communication through a sidelink interface. Therefore, the UE needs to configure a sidelink radio bearer on the sidelink interface. To this end, the UE receives the sidelink radio bearer configuration information for the sidelink from the base station. The sidelink radio bearer configuration information may include RLC bearer configuration information. The RLC bearer configuration information may include parameters necessary to configure an AM RLC entity for a sidelink. For example, the RLC bearer configuration information may include uplink AM RLC configuration information and downlink AM RLC configuration information. For example, the RLC bearer configuration information may include information for bidirectional AM RLC configuration.

The UE may transmit the sidelink radio bearer configuration information to another UE subject to the vehicle communication. For example, the UE may inform the sidelink radio bearer parameter related to the sidelink transmission/reception by indicating another UE of the sidelink radio bearer configuration information. The sidelink identifier selected according to the sidelink radio bearer configuration may comprise at least one of sidelink radio bearer identification information, sidelink RLC bearer identification information, and sidelink logical channel identifier. In addition, the sidelink identifier is selected by the UE or another UE.

As an example, in configuring the sidelink radio bearer, the UE may select and allocate the sidelink radio bearer identification information, the sidelink RLC bearer identification information, and the sidelink logical channel identifier.

As another example, in configuring the sidelink radio bearer, another UE may select and allocate the sidelink radio bearer identification information, the sidelink RLC bearer identification information, and the sidelink logical channel identifier.

However, the sidelink identifier selected by the UE or another UE must be shared between the UE and other UEs, and the sidelink identifier must be recognized with the same meaning. Accordingly, the UE and another UE may share the sidelink identifier.

Meanwhile, when the UE selects the sidelink identifier, the identifier may have already been allocated by another UE for another purpose or for the sidelink communication with another third UE. Therefore, a processing procedure is required in this case.

As an example, when the selected sidelink identifier is an identifier being used by another UE, another UE may transmit failure information to the base station.

Meanwhile, the UE configures the AM RLC entity for the sidelink in the UE by using the sidelink radio bearer configuration information. In addition, the UE may configure the sidelink radio bearer for the vehicle communication and link it to the configured sidelink AM RLC entity. The sidelink radio bearer may be composed of one or more, and the sidelink radio bearer may be configured for each V2X service.

Meanwhile, the sidelink radio bearer configuration information may be received in a different procedure according to the RRC state of the UE.

As an example, the sidelink radio bearer configuration information may be transmitted according to a sidelink radio bearer request signal comprising a QoS parameter of a V2X sidelink session transmitted to the base station when the UE is in an RRC connection state. For example, the base station receives the sidelink radio bearer request signal to the base station. The sidelink radio bearer request signal includes the QoS parameter of the V2X sidelink session. The base station may transmit sidelink radio bearer configuration information to the UE based on the sidelink radio bearer request signal. If necessary, the sidelink radio bearer configuration information may be generated in association with the QoS parameter of the V2X sidelink session.

As another example, the sidelink radio bearer configuration information may be transmitted through system information when the UE is in a RRC idle state or a RRC Inactive state. That is, the base station may broadcast the system information including sidelink radio bearer configuration information.

Referring to FIG. 12, the base station may receive sidelink failure information from the UE, which is generated when the number of transmission data retransmissions in the AM RLC entity configured in the UE reaches a maximum number of retransmissions based on the sidelink radio bearer configuration information at S1210.

For example, the UE may configure the sidelink radio bearer using the sidelink interface based on the sidelink radio bearer configuration information, and the UE may detect whether the number of transmission data retransmissions through the radio bearer in the AM RLC entity linked to the sidelink radio bearer reaches the maximum number of retransmissions.

The UE recognizes that a problem has occurred in the corresponding sidelink when the number of retransmissions for the specific transmission data in the AM RLC entity is indicated by the base station or reaches a pre-configured maximum number of retransmissions. For example, the UE may detect the radio link failure of the sidelink through which the transmission data is transmitted. In this case, the base station needs to allocate a new radio resource to the UE for the sidelink radio resource in which a radio link failure is detected. Alternatively, the base station needs to recognize the radio link failure of the sidelink for any reason.

To this end, when the number of retransmissions for the specific transmission data in the AM RLC entity of the UE is indicated by the base station or reaches a pre-configured maximum number of retransmission, the base station receives the sidelink failure information.

As an example, the sidelink failure information may include at least one of serving cell identification information, serving cell measurement result information, sidelink carrier identification information, time stamp information, UE location information, V2X session identification information, and destination L2 ID information. Through this, the base station checks information on a specific cell, carrier, time, location, or session related to the radio link failure situation of the sidelink reported by the UE. If necessary, the base station may allocate a new sidelink radio resource to the UE.

As another example, the sidelink failure information may include sidelink RRC failure type information when the UE is in an RRC connection state. The UE in the RRC connected state may also transmit and receive data with the base station. Therefore, when the UE transmits the radio link failure information to the base station, it may be difficult for the base station to distinguish whether the corresponding radio link failure is a radio link failure with the base station or a radio link failure to another carrier in a dual connectivity or CA situation. Therefore, when the UE is in the RRC connected state, the UE uses an RRC message that is distinguished from an RRC failure information message, or the UE includes and transmits RRC failure type information that distinguishes the sidelink failure information, in order to distinguish the sidelink failure information.

Meanwhile, the UE may perform the vehicle communication even in an RRC state other than the RRC connection state. That is, since data is directly transmitted and received between the transmitting UE and the receiving UE regardless of the connection state with the base station, the UE in the RRC IDLE state or the RRC Inactive state may also perform the vehicle communication.

Accordingly, when the number of AM RLC retransmissions described above reaches the maximum number of retransmissions, the UE in the RRC IDLE state or the RRC Inactive state needs to report the sidelink failure information to the base station.

For example, when the UE is in the RRC idle state or the RRC Inactive state, the sidelink failure information may be received to the base station through the RRC connection establishment procedure of the UE.

As an example, when the UE is in the RRC idle state, the sidelink failure information may be received to the base station while the UE establishes an RRC connection with the base station or after the RRC connection is established. If the sidelink failure information is received during the RRC connection establishment process, the base station may receive it through an RRC setup request message and an RRC setup completion message and the like from the UE.

As another example, when the UE is in the RRC Inactive state, the sidelink failure information may be received to the base station during the RRC connection resume process for the UE to transition to the RRC connection state or after RRC connection is established. If the sidelink failure information is transmitted during the RRC connection establishment process, the base station may receive it through an RRC resume request message and an RRC resume completion message transmitted from the UE.

Through this operation, the UE may perform the operation of transmitting and receiving sidelink data based on the AM RLC entity without ambiguity, thereby supporting the vehicle communication based on high reliability.

Hereinafter, an embodiment for each detailed step that may be applied in controlling the AM RLC entity-based sidelink data transmission/reception operation by the above-described UE and the base station will be described. The detailed embodiments described below may be performed in each step or each configuration. The detailed embodiment below may be performed individually or in any combination.

In addition, the sidelink AM RLC entity below may mean an AM RLC configured to perform the vehicle communication using the above-described sidelink interface. In addition, the sidelink AM RLC configuration information may mean the above-described RLC bearer configuration information. The sidelink AM RLC configuration information may be included in the above-described sidelink radio bearer configuration information. Alternatively, the sidelink AM RLC configuration information may be described with the same meaning as the above-described sidelink radio bearer configuration information.

Sidelink AM RLC Configuration Embodiment

1) Sidelink AM RLC configuration information for sidelink AM RLC entity configuration for the vehicle communication of a UE may be configured in the UE before the vehicle communication is performed.

For example, in order to support unicast V2X communication using an AM RLC entity, a UE capable of V2X communication may configure the AM RLC entity that provides an RLC AM function through a PC5 sidelink interface. AM RLC entity configuration information for configuration of the AM RLC entity may be pre-configured in the UE. For example, the sidelink AM RLC entity configuration information may include uplink AM RLC configuration information (ul-AM-RLC) and downlink AM RLC configuration information (dl-AM-RLC). The uplink AM RLC configuration information may include one or more information elements of sn-FieldLength, t-PollRetransmit, pollPDU, pollByte, and maxRetxThreshold. The downlink AM RLC configuration information may include one or more information elements of sn-FieldLength, t-Reassembly, and t-StatusProhibit. As described above, the sidelink AM RLC configuration information may be included in the sidelink radio bearer configuration information. In addition, the sidelink AM RLC configuration information may be included in the sidelink RLC bearer configuration information of the sidelink radio bearer configuration information.

Transmitting/receiving UE performing the vehicle communication may pre-configure the sidelink AM RLC configuration information with the uplink AM RLC configuration information as transmitting AM RLC information and the downlink AM RLC configuration information as receiving AM RLC information through sidelink before the vehicle communication. A default value for each of the above-described information elements may be pre-configured in the UE. For example, a maximum retransmission threshold may be pre-configured in the UE. Both the transmitting UE and the receiving UE may be pre-configured with uplink AM RLC configuration information and downlink AM RLC configuration information. Alternatively, the transmitting UE and the receiving UE may pre-configure the sidelink AM RLC entity using the sidelink AM RLC configuration information. The sidelink AM RLC parameter between the transmitting and receiving UEs may be configured with the same value between the transmitting UE and the receiving UE. Through this, it is possible to perform consistent processing between the transmitting UE and the receiving UE. As an example, the maximum retransmission threshold (maxRetxThreshold) included in the transmitting AM RLC configuration information of the transmitting UE and the maximum retransmission threshold (maxRetxThreshold) included in the transmitting AM RLC configuration information of the receiving UE may be configured to have the same value. As another example, the sequence number length (sn-FieldLength) included in the transmitting AM RLC configuration information of the transmitting UE may be configured with the same value as the sequence number length (sn-FieldLength) included in the receiving AM RLC configuration information of the receiving UE.

2) the sidelink AM RLC configuration information for the sidelink AM RLC entity configuration for the vehicle communication of the UE is composed of a plurality of sets having values having different detailed parameters, and each AM RLC configuration information may be classified by an index and configured in the UE.

According to an operator's policy, the sidelink AM RLC configuration information may be pre-configured in the UE by configuring each detailed information element to have a different value. It may be managed by linking an index to each sidelink AM RLC configuration information having different values of the detailed information element. In addition, the index information of the sidelink AM RLC configuration information may be transmitted first when the unicast V2X communication is initiated (e.g., when a sidelink radio bearer is configured) in order to use the RLC AM function. As an example, during the PC5 unicast link setup procedure of a higher layer (e.g., NAS, V2X application layer), the index information of the AM RLC configuration information may be transmitted between the transmitting UE and the receiving UE. As another example, the index information of the sidelink AM RLC configuration information may be transmitted between the transmitting UE and the receiving UE while configuring the sidelink radio bearer through an RRC message.

3) The sidelink AM RLC configuration information may be pre-configured in connection with parameters related to the vehicle communication.

For example, the sidelink AM RLC configuration information linked to at least one of the following parameters may be pre-configured in the UE.

Source L2 ID for identifying the transmitter or destination L2 ID for identifying the target in the V2X sidelink communication Mapping information between V2X service/application layer and the destination L2 ID Information for identifying the transmitting UE in the V2X service/application layer Information for identifying the destination UE in the V2X service/application layer Transmission profile of a protocol data unit transmitted through a PC5 interface provided/indicated by the higher layer Priority/QoS parameter of the protocol data unit transmitted through the PC5 interface provided/instructed by the higher layer for processing a logical channel prioritization of the V2X sidelink communication: For example, PPPP, PPPR, PC5 5QI (PQI)

PC5 5G QoS parameter allocation and retention priority

GFBR (Guaranteed Flow Bit Rate)

QoS information (maximum flow bit rate etc.)

reflective QoS attribute

Range in meters

Each of the above parameters will be described in detail.

One or more sidelink radio bearers may be configured within one source L2 ID and one destination L2 ID. One sidelink radio bearer within one source L2 ID and one destination L2 ID may be classified through a sidelink radio bearer identifier for identifying them. The sidelink radio bearer may include the RLC bearer configuration information such as the NR Uu radio bearer. The RLC bearer configuration information of NR Uu includes logical channel identifier, radio bearer identifier, RLC configuration information, and logical channel configuration information. When the RRC information element of Uu of the NR is applied to the sidelink, the sidelink radio bearer identifier and the sidelink logical channel identifier may be configured in association with the sidelink RLC bearer configuration information.

The source/destination L2 ID may indicate information included in the MAC header. For example, a part of the entire source/destination ID is used as an L1 source/destination ID in SCI (Sidelink Control Information), and the remaining part is carried as a source/destination L2 ID in the MAC header. The source/destination L2 ID is used to identify the source/destination of the corresponding L2 frame on the PC5 interface. The source L2 ID is always self-allocated by the UE generating the L2 frame. The default destination L2 ID associated with the V2X service type may be used in the initial signaling for the configuration of the PC5 unicast link in the higher layer. During the PC5 unicast link setup procedure, the L2 IDs are exchanged. And the source/destination L2 ID is used for subsequent communication between the two UEs.

The V2X service represents a service provided by a V2X application and a V2X application server. For example, the V2X service may be classified into different V2X service types with a Provider Service Identifier (PSID) identifier or ITS-AID (ITS Application Identifier) identifier provided by a service provider.

The V2X application layer identifier is associated with one or more V2X applications in the UE. Since the V2X application layer does not use the L2 ID, the UE maintains mapping information between the application layer ID and the source L2 ID used for the PC5 unicast link. For example, the V2X application layer identifier may be used as an identifier (ex, station ID, vehicle ID, etc.) to identify a specific entity such as a vehicle, a pedestrian, or a road side unit (RSU) within the context of a specific V2X application.

The PC5 QoS information is provided for the PC5 unicast communication from the V2X application layer, and indicates PC5 QoS parameters for the V2X service.

PQI is a special 5QI and indicates a parameter for controlling QoS forwarding treatment for packets transmitted through the PC5 reference point.

PC5 Aggregated Bit Rates indicates the aggregate maximum bit rate for the PC5 link.

Similar to NR Uu, a flow-based QoS model may be used for NR-based PC5 unicast communication. For example, the UE derives the PC5 QoS parameters based on the V2X application requirements provided by the V2X application layer and the V2X service type. The UE allocates a PC5 QoS Flow Identifier (PFI) to this PC5 QoS flow. And it derives the PC5 QoS rule. The PC5 QoS rule includes an IP packet filter set or a V2X packet filter set. The V2X packet filter set may be supported based on a combination of V2X service type, source/destination L2 ID, application layer ID, and extension parameters.

As such, since the PFI (PC5 QoS Flow Identifier) is allocated based on the V2X service type, the source L2 ID, the destination L2 ID, and the application layer ID and used in association with the sidelink radio bearer, the sidelink radio bearer, the sidelink RLC bearer or sidelink logical channel identifier included in the AM RLC entity may be configured in association with one or more of the V2X service type, the source L2 ID, the destination L2 ID, the application layer ID, the 5QI (PQI) and the PC5 5G QoS parameter.

On the other hand, when performing unicast data transmission through a V2X communication session, the sidelink radio bearer identification information, the sidelink RLC bearer identification information or the sidelink logical channel identifier must be matched on the transmitting UE and the receiving UE. In order for the transmitting and receiving UE to transmit and receive data by aligning at least one of a sidelink radio bearer parameter (identification information), a sidelink RLC bearer parameter (identification information), and a sidelink logical channel parameter (identifier), the above-described parameter for identifying the sidelink radio configuration must be matched. However, for convenience of explanation, the sidelink radio bearer identification information, the sidelink RLC bearer identification information, and the sidelink logical channel identifier are indicated as sidelink identifiers below.

The above-described sidelink identifier information must be matched on the transmitting UE and the receiving UE. However, there may be a case where the sidelink identifier information included in the transmitting UE for configuring the sidelink radio bearer is not allowed in the receiving UE. For example, a sidelink radio bearer configuration information for performing data communication using the sidelink identifier information may be received from the other transmitting UE while the receiving UE is already communicating with one transmitting UE using specific sidelink identifier information. In this case, the receiving UE may not use the corresponding sidelink identifier information.

To solve this problem, the following method may be used. Hereinafter, in order to distinguish a UE from a transmission/reception point of view, the above-described UE may be described as a transmitting UE and other UEs as a receiving UE.

As one method, the transmitting UE transmits the sidelink radio bearer configuration information including the sidelink identifier information set information available in the RRC message for the sidelink radio bearer configuration from the transmitting UE to the receiving UE. In this case, the sidelink identifier information may be selected by the transmitting UE or information selected by the base station. The receiving UE may select applicable sidelink identifier information among the received sets and transmit an RRC confirmation message including the selected sidelink identifier information to the transmitting UE. The receiving UE may select any sidelink identifier information among the available sidelink identifier information sets, or the receiving UE may select identifier information having the smallest value.

As another method, the transmitting UE transmits the sidelink radio bearer configuration information including the sidelink identifier information selected by the transmitting UE among the set of available sidelink identifier information on the RRC message for the sidelink radio bearer configuration in the transmitting UE. If the sidelink identifier information selected by the transmitting UE is applicable, the receiving UE may transmit the RRC confirmation message for this. If the sidelink identifier information selected by the transmitting UE is already occupied by the receiving UE and is not applicable, the RRC failure/response message including information on the set of sidelink identifier information available to the receiving UE may be transmitted to the transmitting UE. Alternatively, in the case of a connected state UE, the RRC failure/response message may be transmitted to the base station. As an example, the receiving UE may transmit the RRC failure/response message to the base station. As another example, the receiving UE may transmit the RRC failure/response message to the transmitting UE, and the transmitting UE may transmit it to the base station. In this way, when the transmitting UE transmits the sidelink identifier allocated by the base station or selected by the transmitting UE to the receiving UE, the sidelink identifier may be applied through negotiation with the receiving UE. Alternatively, at the request of the transmitting UE or the receiving UE, the counterpart UE may check and apply the sidelink identifier. Alternatively, if the sidelink identifiers are duplicated, it is determined as a failure case, and the receiving UE (or the counterpart UE) may transmit the indication information thereto to the transmitting UE or the base station. For example, when the transmitting UE initiating the unicast sidelink communication has configured the sidelink radio bearer or transmits it to the receiving UE and the receiving UE knows this, but the receiving UE does not have the corresponding sidelink radio bearer configuration (e.g., When the sidelink identifiers collide), this may be notified to the base station. For convenience of explanation, the sidelink identifier has been described, but the above-described method uses arbitrary sidelink RRC parameters (the logical channel configuration information, the RLC configuration information, PDCP configuration information, SDAP configuration information) may be applied in the same way.

As an example, when the transmitting UE initiates the unicast V2X communication using the RLC AM function, the receiving UE may receive the first RLC AM PDU and configure the receiving AM RLC entity. The receiving UE may use one or more of the above-described parameters to identify the corresponding AM RLC entity (the source L2 ID, the destination L2 ID, the mapping information between V2X service/application layer and destination L2 ID, information for identifying transmitting UE in the V2X service/application layer, Information for identifying the destination UE in the V2X service/application layer, the transmission profile of the V2X communication session provided/indicated by the higher layer, the priority/QoS parameter of the V2X communication session provided/indicated by the higher layer), 5QI (PQI), PC5 5G QoS parameter, the sidelink radio bearer identification information, the sidelink RLC bearer identification information, and the sidelink logical channel identifier.

As another example, a logical connection may be established between two UEs through the PC5 sidelink interface for the unicast V2X communication using the RLC AM function. For convenience of explanation, in the following, a connection through a direct interface (PC5 interface) between UEs is referred to as the logical connection. This is for convenience of description and may be replaced with an arbitrary name. Similar to the RRC connection, the logical connection may be a logical connection between UEs on the AS, a logical connection between UEs at a higher layer such as PC5 signaling, or a logical connection between UEs at the application layer.

If the logical connection is established through the PC5 signaling, the transmitting UE attempting to perform the unicast V2X communication transmits a PC5 signaling message for requesting the V2X direct communication to the receiving UE. The PC5 signaling message may include the above-described AM RLC configuration information. The PC5 signaling message may include one or more configuration information the source L2 ID, the destination L2 ID, the mapping information between V2X service/application layer and destination L2 ID, the information for identifying the transmitting UE in the V2X service/application layer, and the information for identifying the destination UE in the V2X service/application layer, the transmission profile of the V2X communication session provided/indicated by the higher layer, the priority/QoS parameter of the V2X communication session provided/indicated by the higher layer, 5QI (PQI), PC5 5G QoS parameter, the sidelink radio bearer identification information, the sidelink RLC bearer identification information, the sidelink logical channel identifier, the SDAP configuration information and the PDCP configuration information for the corresponding V2X communication session. The receiving UE may configure the corresponding AM RLC entity and other L2 entities (PDCP entity, SDAP entity) associated with the configuration information.

If the logical connection is established through the AS (or RRC) signaling, a transmitting UE that wants to perform the unicast V2X communication transmits the RRC signaling message for configuring the V2X direct communication to the receiving UE. The RRC signaling message may include the aforementioned AM RLC configuration information. The RRC signaling message may include one or more configuration information of the source L2 ID, the destination L2 ID, the mapping information between V2X service/application layer and destination L2 ID, the information for identifying a transmitting UE in V2X service/application layer, and the information for identifying a destination UE in V2X service/application layer, the transmission profile of the V2X communication session provided/indicated by the higher layer, the priority/QoS parameter of the V2X communication session provided/indicated by the higher layer, the 5QI (PQI), the PC5 5G QoS parameter, the sidelink radio bearer identification information, the sidelink RLC bearer identification information, the sidelink logical channel identifier, the SDAP configuration information and the PDCP configuration information for the corresponding V2X communication session. The receiving UE may configure the corresponding AM RLC entity and other L2 entities (PDCP entity, SDAP entity) associated with the configuration information. Here, the SDAP configuration information includes information for mapping a corresponding QoS flow to the sidelink radio bearer similar to the NR. As an example, the SDAP configuration information included in the sidelink radio bearer configuration information may include PFI information. For example, the SDAP configuration information included in the sidelink radio bearer configuration information may include one or more of the V2X service type, the source L2 ID, the destination L2 ID, and an application layer ID linked to the PFI information. Through this, it is possible to configure the sidelink data radio bearer. When the UE establishes the logical connection through the PC5 signaling of the higher layer, the higher layer of the UE informs it to the RRC. When the UE establishes the logical connection through the PC5 signaling of the higher layer, the RRC of the UE may perform an RRC signaling transmission operation on the sidelink interface. If the logical connection is released through the PC5 signaling of the higher layer, the higher layer of the UE informs it to the RRC. The RRC may release the associated sidelink RRC connection and the sidelink data radio bearer.

If the logical connection is established through the V2X application signaling, a transmitting UE that wants to perform the unicast V2X communication transmits an application layer signaling message for requesting the V2X direct communication to the receiving UE. The application layer signaling message may include the aforementioned AM RLC configuration information. The application layer signaling messages may include one or more configuration information of the source L2 ID, the destination L2 ID, the mapping information between V2X service/application layer and destination L2 ID, the information for identifying the transmitting UE in V2X service/application layer, and the information for identifying destination UE in the V2X service/application layer, the transmission profile of the V2X communication session provided/indicated by the higher layer, the priority/QoS parameter of the V2X communication session provided/indicated by the higher layer, the 5QI (PQI), the PC5 5G QoS parameter, the sidelink radio bearer identification information, the sidelink RLC bearer identification information, the sidelink logical channel identifier, the SDAP configuration information and the PDCP configuration information for the corresponding V2X communication session. The receiving UE may configure the corresponding AM RLC entity and other L2 entities (PDCP entity, SDAP entity) associated with the configuration information.

Meanwhile, the above-described signaling (the PC5, the AS, the RRC or the application layer signaling) may be indicated to the UE through a network (e.g. the base station).

As an example, the transmitting UE transmits a request to the network through the Uu interface, and the network transmits the signaling including the sidelink radio bearer configuration information including the aforementioned sidelink AM RLC configuration information to the receiving UE through the Uu interface. The receiving UE may configure the sidelink AM RLC entity and other L2 entities (PDCP entity, SDAP entity) associated with the sidelink AM RLC entity based on the sidelink AM RLC configuration information received by the network. Through this, the receiving UE may configure the sidelink radio bearer by receiving the sidelink radio bearer configuration information.

As another example, the transmitting UE may request the sidelink radio bearer configuration information including the sidelink AM RLC configuration information from the network through the Uu interface. The network transmits signaling including the sidelink radio bearer configuration information including the sidelink AM RLC configuration information to the transmitting UE through the Uu interface. The transmitting UE may configure the sidelink AM RLC entity and other associated L2 entities (PDCP entity, SDAP entity) based on the received sidelink AM RLC configuration information. The transmitting UE indicates signaling including the sidelink AM RLC configuration information to the receiving UE through the PC5 interface. The receiving UE may configure the corresponding sidelink AM RLC entity and other L2 entity (PDCP entity, SDAP entity) associated with the sidelink AM RLC entity based on the sidelink AM RLC configuration information. In this way, the transmitting UE may receive the sidelink radio bearer configuration information through the network. The transmitting UE may transmit the sidelink radio bearer configuration information received through the network to the receiving UE. The receiving UE may configure the sidelink radio bearer by receiving the sidelink radio bearer configuration information.

The above-described method may be applied to the sidelink radio bearer configuration of the RRC connected state UE. For example, through the RRC dedicated message, the transmitting UE may perform the sidelink communication by receiving the sidelink radio bearer configuration information through the network and transmitting it to the receiving UE.

Meanwhile, the UE in an RRC IDLE state or an RRC Inactive state may also perform the sidelink communication. To this end, the RRC IDLE state or RRC Inactive state UE may receive the sidelink radio bearer configuration information through the network through the system information. As an example, the transmitting UE may receive the sidelink radio bearer configuration information transmitted as the system information through the network. The transmitting UE may transmit the sidelink radio bearer configuration information received through the system information to the receiving UE. The receiving UE may configure the sidelink radio bearer by receiving the corresponding information. As another example, the transmitting UE may receive the sidelink radio bearer configuration information transmitted as the system information through the network. The transmitting UE may transmit the sidelink radio bearer configuration information received through the system information to the receiving UE. For example, the transmitting UE may receive the sidelink radio bearer configuration information transmitted as the system information through the network. The receiving UE may configure the sidelink radio bearer when the information received from the transmitting UE and the information received through the system information are the same. As another example, the network may inform the UE of information for indicating any operation for the above-described embodiment through the system information (or an RRC dedicated message). The above-described embodiment may also be applied to an RRC connected state UE.

Although described above as the AM RLC configuration information, the sidelink AM RLC configuration information may be included in the sidelink radio bearer configuration information as described above. Accordingly, the contents described above with the AM RLC configuration information may be replaced with the sidelink radio bearer configuration information.

How to Handle when Maximum Retransmission is Reached in Sidelink AM RLC Entity

When the number of retransmissions in the AM RLC entity reaches the maximum number, the UE in the RRC connection state detects it as RLF (Radio Link Failure).

Hereinafter, the operations for RLF between the UE and the base station will be described.

As an example, upon indication from MCG RLC that the maximum number of retransmissions has been reached for an SRB or for an MCG or split DRB, the RLC entity indicates it to the RRC layer, and the RRC considers the MCG radio link failure. When the UE detects the RLF in the case of a radio link failure for the MCG, the RLF information is stored in the VarRLF-Report. If AS security is not activated, the UE releases the RRC connected state. That is, the UE transitions to the RRC IDLE state. In contrast, when the AS security is activated, the UE performs an RRC connection re-establishment procedure.

As another example, when reaching the maximum number of retransmissions is detected from the SCG RLC entity, the RLC entity indicates it to the RRC layer, and the RRC considers it as an SCG radio link failure. And the UE indicated the base station of the SCG radio link failure through the SCG failure information procedure. The UE configures and transmits a failure type in the RRC message (SCGFailureInformationNR message) transmitted to the base station as information for indicating that the SCG RLC has reached the maximum retransmission (rlc-MaxNumRetx).

Hereinafter, an embodiment of detecting the radio link failure in the vehicle communication supporting the RLC AM function will be described in detail.

1. In the Case of RRC IDLE/Inactive State, an Embodiment of Performing Logging on the Reach of the Maximum Retransmission of the Sidelink The V2X communication may be performed not only in the RRC connected state UE but also in the RRC idle/inactive state UE.

The UE in the RRC idle/inactive state may perform the unicast V2X communication using the RLC AM function through the PC5 interface. If the reach of the maximum number of retransmissions for a specific radio bearer is detected by the sidelink communication RLC entity, the sidelink RLC entity may indicate it to an RRC (or any higher layer, PC5 RRC, PC5-Signalling layer). Alternatively, the sidelink RLC entity may inform the PC5 RRC and indicate it to the PC5-Signalling layer in the PC5 RRC. The UE in the RRC idle/inactive state may record a log on the failure to reach the sidelink maximum RLC retransmission. The corresponding logging may include one or more information of cause information, RRC IDLE/Inactive UE's serving cell identifier (servCellIdentity or physical cell identifier), SSB frequency, serving cell measurement result (measResultServCell), cell level measurement result based on SS/PBCH-related measurement, SS/Beam level measurement result based on PBCH-related measurement, cell level measurement result based on CSI-RS-related measurement, beam level measurement result based on CSI-RS-related measurement, measurement type (SS/PBCH or CSI-RS, cell level or beam level)), carrier identifier performing sidelink communication, carrier frequency, TX resource pool, RX resource pool, measurement result of the corresponding carrier, time at which sidelink maximum RLC retransmission was reached (e.g., timestamp or elapsed time since session start), location information for identifying the V2X communication session through the corresponding sidelink.

In addition, the information for identifying the V2X communication session through the corresponding sidelink may include one or more of a source L2 identifier, a destination L2 identifier, a source IP address, a destination IP address, information for identifying a source UE, information for identifying a destination UE. application identifier, identification information for identifying a specific service/session number of the application, V2X service type, V2X application layer identifier, 5QI (PQI), PC5 5G QoS parameter, PFI, sidelink radio bearer identification information, sidelink RLC bearer identification information and sidelink logical channel identifier.

To this end, the base station may transmit information indicating (e.g., instructing) the UE to perform a corresponding logging (or logged measurement) operation in the RRC IDLE/Inactive state to the UE. The information for indicating (e.g., instructing) the logging operation may be transmitted through the system information or dedicated signaling. The information for indicating the logging operation may include configuration information necessary for the UE to perform the logging operation.

Thereafter, when the RRC IDLE/Inactive UE establishes an RRC connection and enters the RRC connection state (or during the RRC connection establishment procedure or in the RRC connection state), logging information (or information for indicating that corresponding logging information is available) logged to the UE may be transmitted to the base station. If the information for indicating that logging information is available is transmitted to the base station, the base station may perform a separate signaling indicating the UE to transmit the logging information logged to the UE. When the UE receives the separate signaling, it may transmit the logging information to the base station.

2. In the Case of RRC IDLE/Inactive State, an Embodiment of Transmitting Sidelink Failure Information According to Reaching the Maximum Number of Retransmissions by Performing Connection Establishment Through the Uu Interface The V2X communication may be performed not only in the RRC connected state UE but also in the RRC idle/Inactive state UE.

The UE in the RRC idle/inactive state may perform the unicast V2X communication using the RLC AM function through the PC5 interface. If the reach of the maximum number of retransmissions for a specific radio bearer is detected by the sidelink communication RLC entity, the sidelink RLC entity may indicate it to an RRC (or any higher layer, PC5 RRC, PC5-Signalling layer). Alternatively, the sidelink RLC entity may inform the PC5 RRC and indicate it to the PC5-Signalling layer in the PC5 RRC.

The UE in the RRC idle/inactive state must establish the RRC connection in order to configure the associated V2X communication session through the network or for any other reason such as reporting when the number of retransmissions in the sidelink RLC entity reaches the maximum number of retransmissions. To this end, the UE may transition to the RRC connected state. As an example, in order to perform access control by distinguishing the priority of the RRC connection configuration of the UE, the UE may be configured to establish an RRC connection using a new configuration cause or an operator-defined confirmation cause distinguished from the RRC configuration cause of the typical NR (e.g., emergency, highPriorityAccess, mt-Access, mo Signalling mo-Data, mo-VoiceCall, mo-VideoCall, mo-SMS, mps-PriorityAccess, mcs-PriorityAccess). As another example, the UE may establish the RRC connection using one of the RRC configuration causes of the typical NR.

With a V2X control function that provides parameters necessary to use the V2X communication to the UE, the UE or the higher layer of the UE may transmit the sidelink failure information according to the reach of the maximum retransmission of the sidelink RLC through the V3 interface.

Alternatively, the UE or the higher layer of the UE may transmit the sidelink failure information according to the reach of the sidelink RLC maximum retransmission to the V2X application server through the V1 interface.

Alternatively, the UE or the higher layer of the UE may transmit the sidelink failure information according to the reach of the maximum sidelink RLC retransmission to the base station through the Uu interface.

Alternatively, the UE or the higher layer of the UE may transmit the sidelink failure information according to the reach of the maximum sidelink RLC retransmission to the core network entity (e.g., AMF).

The sidelink failure information according to the reach of the maximum sidelink RLC retransmission may include at least one of the following information.

Cause information
Serving cell identifier of RRC IDLE UE (servCellIdentity)
SSB frequency
Serving cell measurement result (measResultServCell)
Cell level measurement result based on SS/PBCH related measurement
Beam level measurement result based on SS/PBCH related measurement
Cell level measurement result based on CSI-RS related measurement
Beam level measurement result based on CSI-RS related measurement
Measurement type (SS/PBCH or CSI-RS, cell level or beam level)
Carrier identifier performing the sidelink communication
Carrier frequency
TX Resource Pool
RX resource pool
Measurement result of the carrier
Time to reach the maximum sidelink RLC retransmission (e.g. timestamp)
Elapsed time
Location information
Information for identifying the V2X communication session through the corresponding sidelink: at least one of information of the source L2 identifier, the destination L2 identifier, the source IP address, the destination IP address, the information for identifying the source UE, the information for identifying the destination UE, the application identifier, the identification information for identifying a specific service/session number of the application, the V2X service type, the V2X application layer identifier, the 5QI (PQI), the PC5 5G QoS parameter, the PFI, the sidelink radio bearer identification information, the sidelink RLC bearer identification, the sidelink logical channel identifier.

The transmitting UE may transmit and receive data by configuring the V2X communication session through the network with the receiving UE of the sidelink failure. That is, the transmitting UE may resume the suspended sidelink V2X communication session through the V2X communication session through the network.

3. An Embodiment of Switching the Sidelink Radio Bearer when the UE in the RRC Connection State Reaches the Maximum Number of Sidelink Communication RLC Retransmissions 1) First Embodiment A UE in an RRC connected state may perform the unicast V2X communication using the RLC AM function through the PC5 interface. If the sidelink communication RLC entity detects that the number of retransmission for a specific radio bearer reaches the maximum number, the sidelink RLC entity may indicate it to an RRC (or any higher layer, PC5 RRC, PC5-Signalling layer). Alternatively, the sidelink RLC entity may inform the PC5 RRC and indicate it to the PC5-Signalling layer in the PC5 RRC.

The RRC of the UE may transmit sidelink failure information to the base station through an uplink RRC message. The UE may distinguish a failure type in the corresponding RRC message and transmit it by configuring the sidelink RLC maximum number of retransmissions to be reached. Through this, the base station may recognize a problem in the sidelink communication.

Upon recognizing the reach of the sidelink communication RLC maximum number of retransmissions, the base station may indicate the UE to switch the V2X communication through the corresponding sidelink to the V2X communication through the network or the Uu interface. Alternatively, when the UE reaches the sidelink communication RLC maximum number of retransmissions, the UE may switch the V2X communication through the sidelink to the V2X communication through the network or the Uu interface. Configuration information required to perform a switching operation from the network may be pre-configured in the UE.

The switching operation may mean an operation of connecting the UE and the V2X control function or the UE and the V2X application server through the network. Alternatively, the switching operation may mean performing a procedure for the UE to switch the sidelink V2X communication session to the V2X communication session through the network by connecting the V2X communication session through the network with the receiving UE based on the information received from the V2X control function or V2X application server. Alternatively, the switching operation may mean switching the sidelink V2X communication session to the V2X communication session through the network during transmitting and receiving data through the sidelink V2X communication session in a state which there is pre-connected through a network between the UE and the V2X control function or the UE and the V2X application server, or the UE pre-connects the V2X communication session through the receiving UE and the network based on information received from the V2X control function or the V2X application server. As an example, the switching operation may be indicated in a state in which the failed V2X communication session is configured in association with a sidelink RLC entity and a Uu RLC entity in one PDCP entity, respectively. As another example, the switching operation may be indicated in a state in which the failed V2X communication session is configured in association with a sidelink PDCP entity and a Uu PDCP entity in one SDAP entity, respectively.

The switching operation may be provided by switching the L2 entity of the V2X communication session through the sidelink to the L2 entity of the V2X communication session through the Uu interface. For lossless transmission, the switching may be performed at the PDCP or the SDAP layer. When the switching operation is performed to provide lossless transmission, the PDCP entity may perform retransmission for unconfirmed PDCP PDUs.

The configuration information for performing/linking the switching of the V2X communication sessions in the PDCP layer or the SDAP layer may include at least one of the information for identifying the V2X communication session, the priority/QoS parameter of the V2X communication session, and the V2X service/application layer, the mapping information with the destination L2 ID, the information for identifying the transmitting UE in the V2X service/application layer, the information for identifying the destination UE in the V2X service/application layer, the transmission profile of the V2X communication session through the sidelink, the source L2 ID and the destination L2 IDs. The configuration information may be pre-configured in the UE or may be received by the base station.

2) Second Embodiment

A UE in an RRC connected state may perform the unicast V2X communication using the RLC AM function through the PC5 interface. If the sidelink communication RLC entity detects reach of the maximum number of retransmissions for a specific radio bearer, the sidelink RLC entity may indicate it to an RRC (or any higher layer, PC5 RRC, PC5-Signalling layer). Alternatively, the sidelink RLC entity may inform the PC5 RRC and indicate it to the PC5-Signalling layer in the PC5 RRC.

The UE may attempt to re-configure the corresponding V2X communication through any PC5 signaling procedure (e.g., discovery procedure, Layer2 link setup procedure, Layer2 link reset procedure, Layer2 link recovery procedure, etc.) through the sidelink. When the UE detects the reach of the maximum number of retransmission performed for the corresponding radio bearer from the sidelink communication RLC entity, the UE suspends the corresponding RLC entity. Alternatively, the UE releases the PC5 RRC connection and data radio bearer including the RLC entity. In signaling for re-configuration of the PC5 unicast link, the transmitting UE may transmit a PC5 signaling message (for example, a direct communication request message, a direct communication re-configuration request broadcast message) for re-configuring a Layer2 link including one or more of the destination L2 ID corresponding to the sidelink radio bearer that declared the sidelink radio link failure, and the source UE information (e.g., the initiating UE's Application Layer ID and the target UE's application Layer ID). The UE attempts to recover the V2X communication by using at least one of the information for identifying the V2X communication session, the priority/QoS parameter of the V2X communication session, the mapping information between the V2X service/application layer and the destination L2 ID, the information for identifying the transmitting UE in the V2X service/application layer, the information for identifying the destination UE at the V2X service/the application layer, the transmission profile of the V2X communication session through the sidelink, the source L2 ID and the destination L2 ID. In order to limit discovery/re-configuration/recovery/PC5 signaling attempts, information on the maximum number of transmissions for any PC5 signaling signal such as discovery/re-configuration/recovery may be pre-configured or configured by the network. When the corresponding switching is performed to provide lossless transmission, the PDCP entity may perform the retransmission for the unconfirmed PDCP PDUs.

The method of each of the embodiments described above may be applied not only to the RRC connected state UE but also to the RRC idle/inactive state UE. In addition, the method of each embodiment may be operated by any trigger rather than reaching the maximum number of retransmissions of the sidelink communication RLC. For example, the base station or the UE may initiate the corresponding operation in consideration of the quality/load state of the sidelink, and this is also included in the scope of the present disclosure.

Through the above-described operations, the present disclosure supports the sidelink communication to which the RLC AM function is applied, thereby providing an improved V2X service. In addition, the present disclosure may reduce service interruption and maintain the V2X communication even when detecting the sidelink radio failure due to the RLC retransmission failure.

Hereinafter, hardware and structural configuration of a UE and a base station capable of performing some or all of the operations of each of the above described embodiments will be described again with reference to the accompanying drawings.

Figure 13:
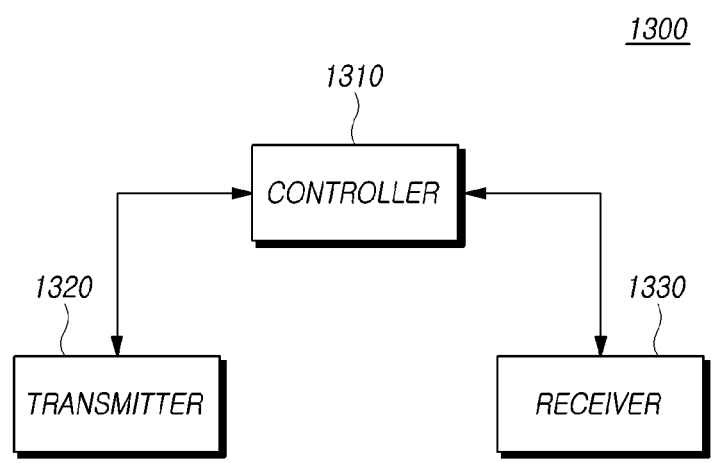
FIG. 13 is a block diagram illustrating a UE according to an embodiment.

FIG. 13 is a block diagram illustrating a UE according to an embodiment.

Referring to FIG. 13, a UE 1300 performing a vehicle communication (or the Vehicle to everything communication, the V2X communication) include a receiver 1330 receiving sidelink radio bearer configuration information for configuring a sidelink radio bearer on a sidelink interface used for the vehicle communication from a base station, a controller 1310 configuring the sidelink radio bearer based on the sidelink radio bearer configuration information, and transmitting the sidelink radio bearer configuration information to another UE subject to the vehicle communication, and detecting a sidelink radio link failure when an AM RLC entity linked to the sidelink radio bearer reaches a maximum number of retransmissions and a transmitter 1320 transmitting the sidelink radio bearer configuration information to another UE subject to the vehicle communication. The controller 1310 may instruct (e.g., inform or indicate) the detection of the sidelink radio link failure to a higher layer regardless of the RRC state of the UE when the sidelink radio link failure is detected.

The receiver 1330 receives the sidelink radio bearer configuration information for the sidelink from the base station. The sidelink radio bearer configuration information may include RLC bearer configuration information. The RLC bearer configuration information may include parameters necessary to configure an AM RLC entity for a sidelink. For example, the RLC bearer configuration information may include uplink AM RLC configuration information and downlink AM RLC configuration information. For example, the RLC bearer configuration information may include information for bidirectional AM RLC configuration.

The controller 1310 may configure an AM RLC entity for the sidelink in the UE using the sidelink radio bearer configuration information. In addition, the controller 1310 may configure a sidelink radio bearer configured on a sidelink interface for the vehicle communication and link it to the configured AM RLC entity. The sidelink radio bearer may be composed of one or more and may be configured for each V2X service.

Since vehicle communication data is transmitted and received through the AM RLC entity, the receiver 1330 receives an acknowledgment message for the transmission data from the receiving UE. If the acknowledgment message (e.g., ACK message) for specific transmission data is not received, the AM RLC entity of the UE performs a retransmission operation.

The controller 1310 recognizes that a problem has occurred in the corresponding sidelink when the number of retransmissions for the specific transmission data in the AM RLC entity is indicated by the base station or reaches a pre-configured maximum number of retransmissions. For example, the UE may detect the radio link failure of the sidelink through which the transmission data is transmitted. In this case, when the base station allocates sidelink radio resources, the UE needs to request the base station to schedule a new sidelink radio resource. Alternatively, the base station needs to recognize the radio link failure of the sidelink for any reason. To this end, when the number of retransmissions for the specific transmission data in the AM RLC entity of the UE is indicated by the base station or reaches a pre-configured maximum number of retransmission, the UE may indicate (e.g., inform) it to a higher layer regardless of the RRC state of the UE.

Meanwhile, when the RRC state of the UE is an RRC connection state, the transmitter 1320 may transmit information for indicating the sidelink radio link failure to the base station. For convenience of explanation, information for indicating the sidelink radio link failure is described as sidelink failure information, but the embodiments are not limited thereto.

As an example, the sidelink failure information may include at least one of serving cell identification information, serving cell measurement result information, sidelink carrier identification information, time stamp information, UE location information, V2X session identification information, and destination L2 ID information. If necessary, the base station may allocate a new sidelink radio resource to the UE 1300. Alternatively, the base station may instruct the switching so that the V2X session is processed through the network.

As another example, the sidelink failure information may include sidelink RRC failure type information when the UE 1300 is in an RRC connection state. The UE 1300 in the RRC connected state may transmit and receive data with the base station. Therefore, when the UE 1300 is in the RRC connected state, the transmitter 1320 may include and transmit RRC failure type information indicating the sidelink radio link fails due to an exceeded number of retransmissions in a specific radio bearer.

Meanwhile, when the UE 1300 is in the RRC idle state or the RRC Inactive state, the sidelink failure information may be transmitted to the base station through the RRC connection establishment procedure of the UE.

As an example, when the UE 1300 is in the RRC idle state, the sidelink failure information may be transmitted to the base station while the UE establishes an RRC connection with the base station or after the RRC connection is established.

As another example, when the UE 1300 is in the RRC Inactive state, the sidelink failure information may be transmitted to the base station during the RRC connection resume process for the UE 1300 to transition to the RRC connection state or after RRC connection is established.

The sidelink identifier selected according to the sidelink radio bearer configuration may include at least one of sidelink radio bearer identification information, sidelink RLC bearer identification information, and sidelink logical channel identifier. In addition, the sidelink identifier is selected by the UE or another UE.

As an example, in configuring the sidelink radio bearer, the controller 1310 may select and allocate the sidelink radio bearer identification information, the sidelink RLC bearer identification information, and the sidelink logical channel identifier.

As another example, in configuring the sidelink radio bearer, another UE may select and allocate the sidelink radio bearer identification information, the sidelink RLC bearer identification information, and the sidelink logical channel identifier.

However, the sidelink identifier selected by the UE 1300 or another UE must be shared between the UE 1300 and another UEs, and the sidelink identifier must be recognized with the same meaning. Accordingly, the UE 1300 and another UE may share the sidelink identifier.

Meanwhile, when the UE 1300 selects the sidelink identifier, the identifier may have already been allocated by another UE for another purpose or for the sidelink communication with the other third UE. Therefore, a processing procedure is required in this case.

As an example, when the selected sidelink identifier is an identifier being used by another UE, another UE may transmit failure information to the base station.

Meanwhile, the sidelink radio bearer configuration information may be received in a different procedure according to the RRC state of the UE 1300.

As an example, the sidelink radio bearer configuration information may be received according to a sidelink radio bearer request signal including a QoS parameter of a V2X sidelink session transmitted to the base station when the UE 1300 is in an RRC connection state. For example, the transmitter 1320 may transmit the sidelink radio bearer request signal to the base station. The sidelink radio bearer request signal includes the QoS parameter of the V2X sidelink session. The base station may transmit sidelink radio bearer configuration information to the UE 1300 based on the sidelink radio bearer request signal. If necessary, the sidelink radio bearer configuration information may be generated in association with the QoS parameter of the V2X sidelink session.

As another example, the sidelink radio bearer configuration information may be received through system information when the UE is in a RRC idle state or a RRC Inactive state. That is, the base station may broadcast the system information including sidelink radio bearer configuration information.

In addition, the controller 1310 controls the overall operation of the UE 1300 according to the AM RLC-based sidelink communication configuration and sidelink failure processing operation required to perform the above-described embodiments.

In addition, the transmitter 1320 and the receiver 1330 are used to transmit and receive signals, messages, and data necessary for performing the above-described embodiments with a base station, other UEs, and each entity on the V2X architecture.

Figure 14:
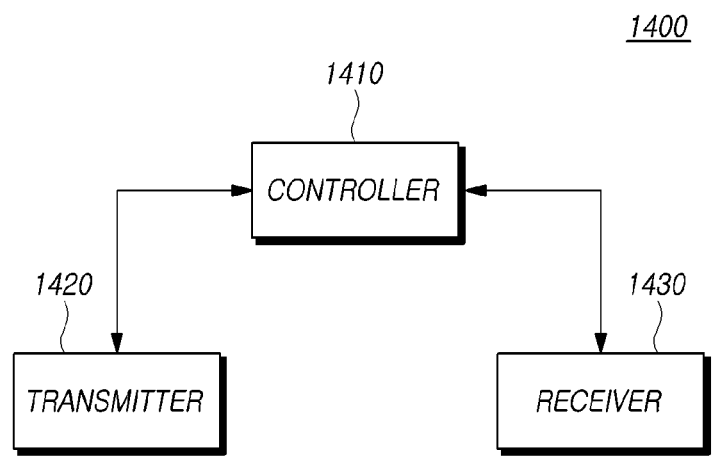
FIG. 14 is a block diagram illustrating a base station according to an embodiment.

FIG. 14 is a block diagram illustrating a base station according to an embodiment.

Referring to FIG. 14, a base station 1400 controlling a vehicle communication (or a Vehicle to everything communication, a V2X communication) may include a transmitter 1420 transmitting sidelink radio bearer configuration information for configuring a sidelink radio bearer on a sidelink interface used for the vehicle communication to the UE, and a receiver 1430 receiving sidelink failure information from the UE, which is generated when the number of transmission data retransmissions in the AM RLC entity configured in the UE reaches a maximum number of retransmissions based on the sidelink radio bearer configuration information The sidelink radio bearer configuration information may include RLC bearer configuration information. The RLC bearer configuration information may include parameters necessary to configure an AM RLC entity for a sidelink. For example, the RLC bearer configuration information may include information for bidirectional AM RLC configuration using uplink AM RLC configuration information and downlink AM RLC configuration information.

The UE configures the AM RLC entity for the sidelink in the UE by using the sidelink radio bearer configuration information. In addition, the UE may configure the sidelink radio bearer for the vehicle communication and link it to the configured sidelink AM RLC entity. The sidelink radio bearer may be composed of one or more and may be configured for each V2X service.

In addition, the UE may configure the sidelink radio bearer using the sidelink interface based on the sidelink radio bearer configuration information and detect whether the number of transmission data retransmissions through the radio bearer in the AM RLC entity linked to the sidelink radio bearer reaches the maximum number of retransmissions. The UE recognizes that a problem has occurred in the corresponding sidelink when the base station indicates the number of retransmissions for the specific transmission data in the AM RLC entity or when the number of retransmissions for the specific transmission data reaches a pre-configured maximum number of retransmissions.

When the base station indicates the number of retransmissions for the specific transmission data in the AM RLC entity of the UE or when the number of retransmissions reaches a pre-configured maximum number of retransmission, the receiver 1430 receives the sidelink failure information.

As an example, the sidelink failure information may include at least one of serving cell identification information, serving cell measurement result information, sidelink carrier identification information, time stamp information, UE location information, V2X session identification information, and destination L2 ID information.

As another example, the sidelink failure information may include the sidelink RRC failure type information when the UE is in an RRC connection state. The controller 1410 may receive the sidelink failure information including the sidelink RRC failure type information indicating that a sidelink failure according to an exceeded number of retransmissions in a sidelink (or a specific radio bearer) to obtain information on the failure type.

When the UE is in the RRC idle state or the RRC Inactive state, the receiver 1430 may receive the sidelink failure information through the RRC connection establishment procedure of the UE.

As an example, when the UE is in the RRC idle state, the receiver 1430 may receive the sidelink failure information while the UE establishes an RRC connection with the base station or after the RRC connection is established. As another example, when the UE is in the RRC Inactive state, the receiver 1430 may receive the sidelink failure information during the RRC connection resume process for the UE to transition to the RRC connection state or after RRC connection is established.

The UE may transmit the sidelink radio bearer configuration information to another UE subject to the vehicle communication. For example, the UE may inform the sidelink radio bearer parameter related to the sidelink transmission/reception by indicating another UE of the sidelink radio bearer configuration information.

The sidelink identifier selected according to the sidelink radio bearer configuration may include at least one of sidelink radio bearer identification information, sidelink RLC bearer identification information, and sidelink logical channel identifier. In addition, the sidelink identifier is selected by the UE or the other UE.

As an example, in configuring the sidelink radio bearer, the UE may select and allocate the sidelink radio bearer identification information, the sidelink RLC bearer identification information, and the sidelink logical channel identifier.

As another example, in configuring the sidelink radio bearer, another UE may select and allocate the sidelink radio bearer identification information, the sidelink RLC bearer identification information, and the sidelink logical channel identifier.

However, the sidelink identifier selected by the UE or another UE must be shared among the UE and another UEs, and the sidelink identifier must be recognized with the same meaning. Accordingly, the UE and another UE may share the sidelink identifier.

Meanwhile, when the UE selects the sidelink identifier, the identifier may have already been allocated by another UE for another purpose or for the sidelink communication with the other third UE. Therefore, a processing procedure is required in this case.

As an example, when the selected sidelink identifier is an identifier being used by another UE, another UE may transmit failure information to the base station. Therefore, the receiver 1430 may receive the failure information from the other UE.

Meanwhile, the sidelink radio bearer configuration information may be received in a different procedure according to the RRC state of the UE.

As an example, the sidelink radio bearer configuration information may be transmitted according to a sidelink radio bearer request signal comprising a QoS parameter of a V2X sidelink session transmitted to the base station when the UE is in an RRC connection state. For example, the base station receives the sidelink radio bearer request signal to the base station. The sidelink radio bearer request signal includes the QoS parameter of the V2X sidelink session. The base station may transmit sidelink radio bearer configuration information to the UE based on the sidelink radio bearer request signal. If necessary, the sidelink radio bearer configuration information may be generated in association with the QoS parameter of the V2X sidelink session.

As another example, the sidelink radio bearer configuration information may be transmitted through system information when the UE is in a RRC idle state or a RRC Inactive state. That is, the base station may broadcast the system information including sidelink radio bearer configuration information.

In addition, the controller 1410 controls the overall operation of the base station 1400 according to the AM RLC-based sidelink communication configuration and the sidelink failure processing operation required to perform the above-described embodiments.

In addition, the transmitter 1420 and the receiver 1430 are used to transmit and receive signals, messages, and data necessary for performing the above-described embodiments with a UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the disclosure shall be construed on the basis of the accompanying claims in such a manner that all of the technical ideas included within the scope equivalent to the claims belong to the disclosure.

The invention claimed is:

1. A method of performing a vehicle communication by a user equipment (UE), the method comprising:
 receiving sidelink radio bearer configuration information for configuring a sidelink radio bearer on a sidelink interface used for the vehicle communication from a base station;
 configuring the sidelink radio bearer based on the sidelink radio bearer configuration information, and transmitting the sidelink radio bearer configuration information to another UE subject to the vehicle communication;
 detecting a sidelink radio link failure when an acknowledged mode (AM) radio link control (RLC) entity linked to the sidelink radio bearer reaches a maximum number of retransmissions; and
 indicating the detection of the sidelink radio link failure to a higher layer regardless of the radio resource control (RRC) state of the UE when the sidelink radio link failure is detected.

2. The method according to claim 1, wherein the sidelink radio bearer configuration information comprises RLC bearer configuration information comprising information for bidirectional AM RLC configuration.

3. The method according to claim 1, further comprising: transmitting sidelink failure information according to the sidelink radio link failure detection to the base station when the radio resource control (RRC) state of the UE is an RRC connection state.

4. The method according to claim 3, wherein the sidelink failure information comprises destination L2 ID information.

5. The method according to claim 1, wherein the sidelink identifier selected according to the sidelink radio bearer configuration comprises at least one of sidelink radio bearer identification information, sidelink RLC bearer identification information, and sidelink logical channel identifier, and is selected by the UE or another UE.

6. The method according to claim 5, wherein when the selected sidelink identifier is an identifier being used by another UE, another UE transmits RRC failure message to the UE.

7. The method according to claim 6, wherein when the UE receives the RRC failure message from another UE, the UE transmits the RRC failure message to the base station.

8. The method according to claim 1, wherein indicating the detection of the sidelink radio link failure to a higher layer further includes releasing the sidelink radio bearer and releasing PC5-RRC connection.

9. A method of controlling a vehicle communication by a base station, the method comprising:
 transmitting sidelink radio bearer configuration information for configuring a sidelink radio bearer on a sidelink interface used for the vehicle communication to a user equipment (UE);
 receiving sidelink failure information from the UE, which is generated when a number of data retransmissions in an acknowledged mode (AM) radio link control (RLC) entity configured in the UE reaches a maximum number of retransmissions based on the sidelink radio bearer configuration information,
 wherein the UE configures the sidelink radio bearer using the sidelink interface based on the sidelink radio bearer configuration information and detects whether the number of data retransmissions through the radio bearer in the AM RLC entity linked to the sidelink radio bearer reaches the maximum number of retransmissions.

10. The method according to claim 9, wherein the sidelink radio bearer configuration information is transmitted to another UE subject to vehicle communication through the UE.

11. The method according to claim 9, wherein the sidelink radio bearer configuration information comprises RLC bearer configuration information comprising information for bidirectional AM RLC configuration.

12. The method according to claim 9, wherein the sidelink failure information comprises destination L2 ID information.

13. A user equipment (UE) performing a vehicle communication, the UE comprising:
 a receiver configured to receive sidelink radio bearer configuration information for configuring a sidelink radio bearer on a sidelink interface used for the vehicle communication from a base station;
 a controller configured to configure the sidelink radio bearer based on the sidelink radio bearer configuration information, transmit the sidelink radio bearer configuration information to another UE subject to the vehicle communication, and detect a sidelink radio link failure when an acknowledged mode (AM) radio link control (RLC) entity linked to the sidelink radio bearer reaches a maximum number of retransmissions; and a transmitter configured to transmit the sidelink radio bearer configuration information to another UE subject to the vehicle communication, wherein the controller instructs the detection of the sidelink radio link failure to a higher layer regardless of a radio resource control (RRC) state of the UE when the sidelink radio link failure is detected.

14. The UE according to claim 13, wherein the sidelink radio bearer configuration information comprises RLC bearer configuration information comprising information for bidirectional AM RLC configuration.

15. The UE according to claim 13, wherein the transmitter transmits sidelink failure information according to the sidelink radio link failure detection to the base station when the RRC state of the UE is an RRC connection state.

16. The UE according to claim 15, wherein the sidelink failure information comprises destination L2 ID information.

17. The UE according to claim 13, wherein the sidelink identifier selected according to the sidelink radio bearer configuration comprises at least one of sidelink radio bearer identification information, sidelink RLC bearer identification information, and sidelink logical channel identifier, and is selected by the UE or another UE.

18. The UE according to claim 17, wherein when the selected sidelink identifier is an identifier being used by another UE, another UE transmits RRC failure message to the UE.

19. The UE according to claim 18, wherein when the RRC failure message is received, the transmitter transmits the RRC failure message to the base station.

20. The UE according to claim 13, wherein when the sidelink radio link failure is detected, the controller releases the sidelink radio bearer and disconnects PC5-RRC connection.

* * * * *